(12) United States Patent
DeMeritt et al.

(10) Patent No.: US 10,215,941 B2
(45) Date of Patent: Feb. 26, 2019

(54) STRUCTURES AND METHOD FOR THERMAL MANAGEMENT IN ACTIVE OPTICAL CABLE (AOC) ASSEMBLIES

(71) Applicant: CORNING OPTICAL COMMUNICATIONS LLC, Hickory, NC (US)

(72) Inventors: Jeffery Alan DeMeritt, Painted Post, NY (US); Allen Michael Miller, Lenoir, NC (US); Martin Eugene Norris, Lenoir, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/704,697

(22) Filed: Sep. 14, 2017

(65) Prior Publication Data

US 2018/0003911 A1 Jan. 4, 2018

Related U.S. Application Data

(63) Continuation of application No. 14/332,463, filed on Jul. 16, 2014, now Pat. No. 9,778,430, which is a
(Continued)

(51) Int. Cl.
*G02B 6/44* (2006.01)
*G02B 6/38* (2006.01)
(Continued)

(52) U.S. Cl.
CPC ......... *G02B 6/4436* (2013.01); *G02B 6/3814* (2013.01); *G02B 6/3887* (2013.01);
(Continued)

(58) Field of Classification Search
None
See application file for complete search history.

(56) References Cited

U.S. PATENT DOCUMENTS

| 3,790,791 A | 2/1974 | Anderson |
| 4,648,688 A | 3/1987 | Ashman et al. |

(Continued)

FOREIGN PATENT DOCUMENTS

| CN | 101881864 A | 11/2010 |
| DE | 102009025556 B4 | 8/2013 |
| WO | 2002039167 A1 | 5/2002 |

OTHER PUBLICATIONS

Chinese Office Action, issued in corresponding CN Application No. 2013800104288, dated Jul. 24, 2015.
(Continued)

*Primary Examiner* — Chad H Smith
(74) *Attorney, Agent, or Firm* — Michael E. Carroll, Jr.

(57) ABSTRACT

Disclosed are structures and methods for active optic cable (AOC) assembly having improved thermal characteristics. In one embodiment, an AOC assembly includes a fiber optic cable having a first end attached to a connector with a thermal insert attached to the housing for dissipating heat from the connector. The AOC assembly can dissipate a suitable heat transfer rate from the active components of the connector such as dissipating a heat transfer rate of 0.75 Watts or greater from the connector. In one embodiment, the thermal insert is at least partially disposed under the boot of the connector. In another embodiment, at least one component of the connector has a plurality of fins. Other AOC assemblies may include a connector having a pull tab for dissipating heat from the assembly.

19 Claims, 13 Drawing Sheets

Related U.S. Application Data continuation of application No. PCT/US2013/026993, filed on Feb. 21, 2013.

(60) Provisional application No. 61/601,351, filed on Feb. 21, 2012, provisional application No. 61/601,355, filed on Feb. 21, 2012.

(51) Int. Cl.
*G02B 6/42* (2006.01)
*G02B 6/12* (2006.01)

(52) U.S. Cl.
CPC ......... *G02B 6/4249* (2013.01); *G02B 6/4268* (2013.01); *G02B 6/4284* (2013.01); *G02B 6/4471* (2013.01); *G02B 6/4214* (2013.01); *G02B 2006/12166* (2013.01); *Y10T 29/49826* (2015.01)

(56) References Cited

U.S. PATENT DOCUMENTS

| | | | |
|---|---|---|---|
| 6,477,056 | B1 | 11/2002 | Edwards et al. |
| 7,457,126 | B2 | 11/2008 | Ahrens |
| 8,041,160 | B2 | 10/2011 | Meadowcroft et al. |
| 2002/0181902 | A1 | 12/2002 | O'Connor |
| 2003/0063865 | A1 | 4/2003 | Holmquist |
| 2003/0174454 | A1* | 9/2003 | Fu .................. G02B 6/4201 361/103 |
| 2006/0210225 | A1* | 9/2006 | Fujiwara ............. G02B 6/4214 385/92 |
| 2008/0044141 | A1 | 2/2008 | Willis et al. |
| 2010/0232800 | A1 | 9/2010 | Meadowcroft et al. |
| 2010/0284656 | A1 | 11/2010 | Morra et al. |
| 2011/0081119 | A1 | 4/2011 | Togami et al. |
| 2011/0293221 | A1* | 12/2011 | Kaneshiro ............. G02B 6/4201 385/49 |
| 2011/0317964 | A1* | 12/2011 | Downs ................. G02B 6/4201 385/92 |
| 2013/0084044 | A1 | 4/2013 | Ertel et al. |
| 2013/0209043 | A1 | 8/2013 | Norris et al. |

OTHER PUBLICATIONS

Chinese Search Report, issued in corresponding CN Application No. 2013800104288, dated Jul. 15, 2015.

CN201380010428.8 Third Office Action dated Feb. 15, 2017, China Patent Office.

EP Rule 161 Communication, issued in corresponding EP Application No. 13721568.7, dated Oct. 6, 2014.

G. Neal, J. M. Finan; "Thermally Conductive Thermoplastics. A Viable Alternative for Coil Wound and Passive Component Construction"; Encap LLC website. www.encaptech.com.

International Search Report of the International Searching Authority; PCT/US2013/026993; dated Jun. 18, 2013 11 Pages.

IPRP issued in corresponding PCT Application No. PCT/US2013/026993, dated Aug. 26, 2014.

Molex "zQSFP+ ™ Interconnect System" website, http://www.molex.com/molex/products/family?key=zqsfp_interconnect_system&channel=products&chanName=family&pageTitle=Introduction, 5 pages.

Tyco Electronics, "Quad Small Form-factor Pluggable (QSFP) Interconnect System" Slideshare presentation, http://www.slideshare.net/element14/quad-small-formfactor-pluggable-qsfp-interconnect-system, 17 pages.

\* cited by examiner

STRUCTURES AND METHOD FOR THERMAL MANAGEMENT IN ACTIVE OPTICAL CABLE (AOC) ASSEMBLIES

PRIORITY APPLICATIONS

This application is a continuation of U.S. patent application Ser. No. 14/332,463, filed on Jul. 16, 2014, which is a continuation of International Application No. PCT/US13/26993 filed on Feb. 21, 2013, which claims the benefit of priority to U.S. Application Nos. 61/601,351 and 61/601,355, both filed on Feb. 21, 2012, the content of which is relied upon and incorporated herein by reference in entirety.

FIELD

The disclosure relates generally to thermal management for active optical cable assemblies. Specifically, the disclosure relates to structures and methods for dissipating heat from active optical cable assemblies.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, displays, tablets and the like the use of optical fibers for signal transmission is being considered for replacing the conventional copper-based connectivity for these applications. This is because high-speed communication among electronic devices over any but the shortest cable distances such as 1-2 meters is impractical with purely electrical cable assemblies. However, much longer transmission lengths such as tens of meters are possible using active optic cable assemblies with optical fiber as the transmission media. Active optic cable assemblies use electrical connectors for providing compatibility with an electrical port, but convert the electrical signal to optical signals such as within the connector (i.e., electrical-to-optical conversion and vice-versa) for optical transmission of signals across optical fibers between the electrical connectors on the ends of the cable. Moreover, the future transition from standard electrical protocol (i.e., copper-based connectivity) to a fully optical-based connectivity will be eased by the commercialization of active optical cable assemblies in which the conversion of signals from electrical-to-optical and optical-to-electrical occurs in the first few centimeters of a cable assembly such as within the connector, which may use an existing protocol such as HDMI, USB, MiniDisplay Port, or the like.

The function of converting electrical interface/protocols to suitable bit streams and faithfully launching them into optical fibers and capturing and decoding them at the receiver end requires appreciable electrical circuitry typically in the form of a printed circuit board assembly carrying laser drivers, integrated circuits, clock and data recovery (CDR) devices, trans-impedance amplifiers (TIA) and passive electrical components to name a few. With major thermal contributions from a few of these devices and smaller thermal contributions from other devices it is common to have a relatively large aggregate waste or parasitic thermal power being generated by the electrical circuitry of the active optic cable assembly that may result in premature failure of electronic devices due to excessive temperature and/or uncomfortably high temperatures on surfaces of the connector for the user. Moreover, the desire for having relatively small footprints for the active optic assemblies compounds the heat generation concerns for the assemblies.

Thus, there is an unresolved need for active optic cable assemblies with improved heat dissipation characteristics.

SUMMARY

The disclosure is directed to structures and methods for making active optic cable (AOC) assemblies having improved thermal characteristics. One aspect of the disclosure is directed to an AOC assembly having a fiber optic cable having a first end attached to a connector with the connector having a thermal insert attached to a housing of the connector for dissipating a suitable amount of heat flux from the connector such as dissipating a heat transfer rate (i.e., flux) of 0.75 Watts or greater from the connector. The AOC assembly may maintain the connector outer surface below 60° C. In further embodiments, the thermal insert may have a portion at least partially disposed under the boot of the connector.

In other optional variations, the connector may have a one or more components with a plurality of fins such as a boot with a plurality of fins for dissipating heat from the connector and/or a connector body having a plurality of fins. The AOC assembly can dissipate a suitable amount of heat flux from the connector such as dissipating a heat transfer rate (i.e., flux) of 0.75 Watts or greater from the connector, but other suitable values for dissipating heat transfer rate from the connector are possible according to the concepts disclosed herein. Another aspect of the disclosure is directed to an AOC assembly having a fiber optic cable having a first end attached to a connector having a housing, and a pull tab for dissipating heat from the connector, where the pull tab extends into the housing of the connector. The AOC assembly can dissipate a suitable amount of heat flux from the connector such as dissipating a heat transfer rate of 0.75 Watts or greater from the connector, but other suitable values for dissipating heat flux from the connector are possible according to the concepts disclosed herein.

The disclosure is also directed to a method for making an AOC assembly including providing a fiber optic cable, providing a connector having a housing, and attaching the connector to the fiber optic cable so that the assembly can dissipate a heat transfer rate of 0.75 Watts or greater from the connector. The method and connector may maintain the connector outer surface below 60° C. The method may also include overmolding a boot and/or a connector body that has a plurality of fins. Other embodiments may include attaching a thermal insert under the boot of the connector.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
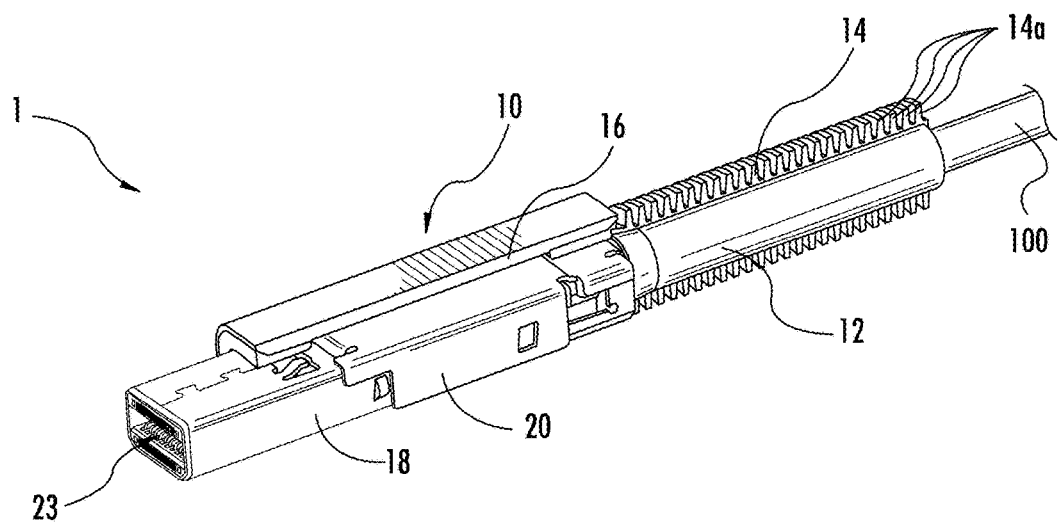
FIG. 1 is a partial cross-sectional view of an active optical cable assembly having features for dissipating heat from the connector according to the concepts disclosed herein.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

The concepts disclosed are directed to heat dissipation in active optic cable (AOC) assemblies. AOC assemblies convert an inputted electrical signal at the plug interface to an optical signal such as within the connector housing for transmission of optical signals along optical fibers in a cable and then converts the transmitted optical signal back to an electrical signal at the output side such as a second plug interface and vice-versa. The AOC assemblies use of electrical/optical components on a printed circuit board assembly for converting the signals (i.e., e/o and o/e conversions) that generate significant heat in the connector and can result in elevated temperatures for the AOC assembly. In other words, the power-in to the printed circuit board assembly is greater than the power-out of the printed circuit board assembly, thereby generating a significant amount of heat energy and raising the temperature of the AOC connector so it may become warm to the touch. Moreover, the amount of heat generated during the conversion of the signals in AOC assembly may also vary based on factors such as number and type of active components used (e.g., circuit board design), transmission speeds, placement of components, etc. By way of example, a given AOC assembly may generate a significant power-out (e.g., heat energy) such as of 0.75 Watts or more, 0.85 Watts or more, and even 1.0 Watts or more. Thus, as the amount of heat energy generated by the AOC assembly increases the cooling of the device becomes more important along with being more difficult to dissipate the heat. Moreover, as devices get smaller and thinner the cable assembly connecting the devices is also expected to have a similar size/footprint which may also complicate cooling since the connector footprint is smaller. The AOC assemblies and methods described herein are advantageous since they improve the heat dissipation characteristics of the AOC assemblies, thereby providing a lower surface temperature for the user along with keeping electrical components cooler which is beneficial for continuous use and longer life. Specifically, the improved AOC assemblies disclosed herein passively dissipate heat so that the temperature does not exceed predetermined values.

Figure 2:
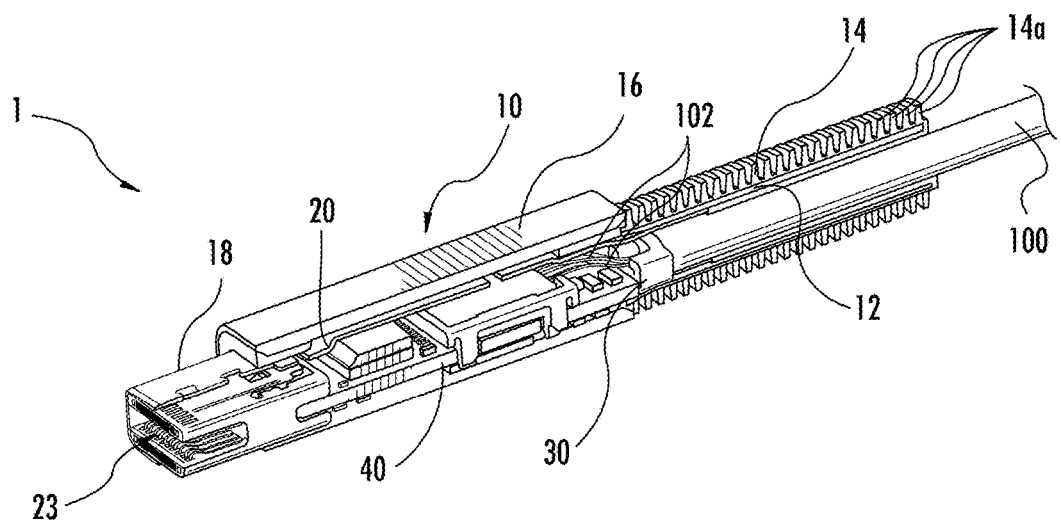
FIG. 2 is a further cross-sectional view of the active optical cable assembly of FIG. 2 showing internal elements of the connector.

Several different concepts are disclosed for improving the heat transfer characteristics of an AOC assembly, which may be used independently or together as desired. Moreover, the concepts disclosed herein were modeled to determine the thermal performance. By way of example, FIGS. 1 and 2 are partial cross-sectional views of a first AOC assembly 1 having a fiber optic cable 100 attached to a connector 10 that may have a heat transfer rate of 0.75 Watts or greater from the connector 10 for dissipating heat energy created by the electrical components of the connector 10. In one embodiment, the heat flux is dissipated from the connector, in part, by a thermal insert and/or at least one component having a plurality of fins as disclosed herein. Moreover, at least one component having the plurality of fins is disposed at least partially outward of a housing of the connector. As shown, connector 10 of AOC assembly 1 includes a strain relief boot 14 (herein after boot) having a plurality of fins 14a for providing the primary thermal transfer medium by way of convention and radiation to the environment. In order to allow boot 14 to have an effective thermal transfer from the connector 10, the AOC assembly 1 has a continuous low thermal impedance path between any sources of heat (e.g., the heat generating electrical devices in connector 10) and boot 14. Additionally, the connector 10 has good contact (e.g., low interface resistance) between boot 14 and any components which are transporting heat to it. Further, boot 14 is a good thermal conductor since it includes the plurality of fins 14a having a suitable shape and size which permits good free-convective airflow and a large surface area for transferring heat to the outside environment. In other words, the use of the fins increases the surface area of the boot or other component for improving the transfer of heat, out the connector and to the environment. In this embodiment, boot 14 and fins 14a have a generally round shape having a continuous size that extends rearward; however other suitable shapes are possible according to the concepts disclosed.

In this embodiment, connector 10 provides a thermal path from the connector to boot 14 using a thermal insert 12 having at least a portion under boot 14. By way of example, thermal insert 12 is a metal insert (or other suitable material) for providing thermal transfer from the connector 10 to the boot 14 and, for instance, is made from a material including copper or other suitable thermal conductor such as aluminum, brass or the like. However, other non-metal thermally conductive materials may be used for the thermal insert if the material has suitable thermal properties such as a material having a filler or a thermally conductive plastic. Other variations for the thermal insert are also possible.

Figure 10:
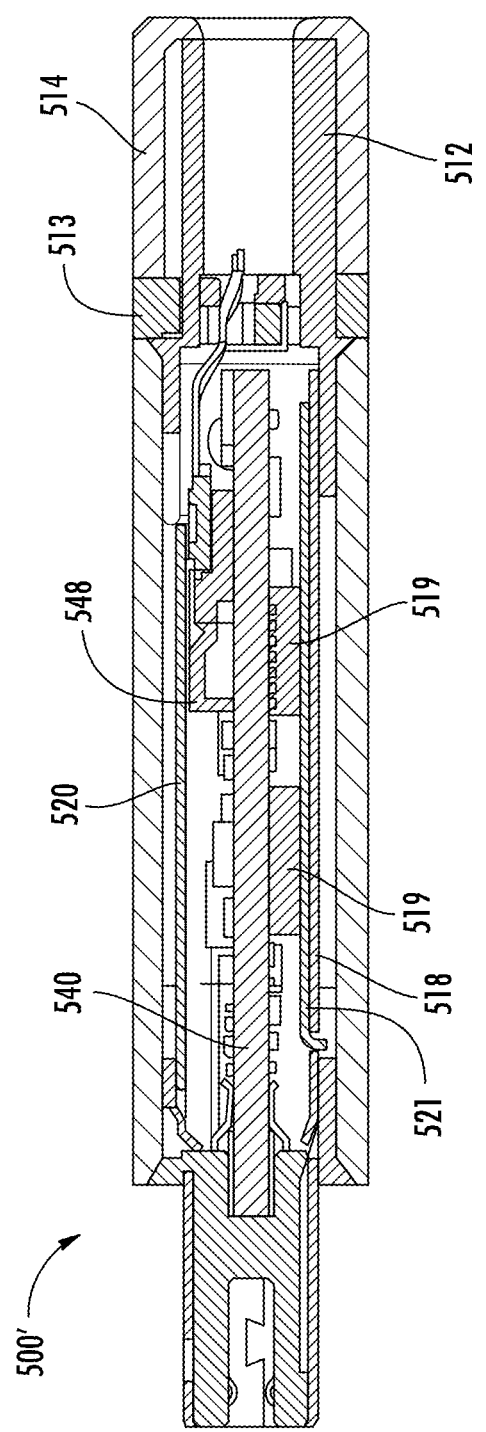
FIG. 10 is a cross-sectional view of an active optical cable assembly similar to FIG. 8 showing additional features for dissipating heat from the connector according to the concepts disclosed herein.

In this embodiment, thermal insert 12 is disposed under boot 14, and the low interface resistance for thermal transfer is provided in this embodiment by the over-molding of boot 14 about the thermally conductive insert. Thermal insert 12 is also attached to a portion of the connector such as the housing for creating a thermal path from the connector to the thermal insert. In other embodiments, boot 14 may be a component that is slid over the thermal insert; instead of being overmolded about the thermal insert 12. Boot 14 is formed of high thermally conductive material and the fin/surface area provided is sufficient to transfer the heat out of the connector and to the environment to dump the desired heat flux and cool the connector to a suitable temperature. The connector may also include other optional structure/design features for further increasing the heat transfer/heat flux out of the connector. For instance, the top portion of the metal shell could also be made of plated copper or the like for improving the transport of thermal energy toward the back end (e.g., the cable end) of the connector such as toward the thermal insert/boot. Another variation is using an enlarged, and possibly thickened, thermal shim that could be captured in the crimp of the connector for improving axial thermal flow toward the back end of the connector. Embodiments may also include thermal pads, thermal shims, and/or a thermal paste for further improving heat transfer characteristics among components (i.e., improving heat transfer characteristics of the connector such as dissipating heat from integrated chips to the housing) and lowering the temperature of the connector body. Other embodiments may use the concepts of a thermal insert, but may not require a boot or other component having a plurality of fins while still providing suitable heat transfer characteristics/performance (FIG. 10).

As best shown in FIG. 2, connector 10 includes other components within a housing formed by a first housing portion 18 and a second housing portion 20 (FIG. 1) that are partially disposed under a connector body 16. The heat generating components of connector 10 are disposed within the housing and are disposed on a printed circuit board assembly (PCBA) 40 as known in the art. The heat generating components on the PCBA 40 can include one or more active electrical components such as vertical-cavity surface emitting lasers (VCSELs) and integrated circuits (ICs) such as laser drivers, clock and data recovery ICs and the like.

Significant heat energy can be generated by these active components during operation and can cause elevated temperatures for the connector if the heat energy is not dissipated throughout the connector. By way of example, the active electrical components can easily cause a heat transfer rate of 0.75 Watts or more inside the connector 10. Consequently, improved AOC assembly designs disclosed herein dissipate a given heat transfer rate during steady-state operation of the assembly such as dissipating a heat transfer rate of 0.75 Watts or greater from the connector, 0.85 Watts or greater, or 1 Watts or greater from the connector.

Additionally, the front end of connector 10 includes an electrical interface 23 that is electrically attached to the PCBA 40 for electrical connection to a device. At the rear end of the connector 10, fiber optic cable 100 has its strength members 104 attached to a collar 30 and optical fibers 102 are attached to an optical interface such as a total-internal reflection (TIR) block at a first end of the fiber optic cable. The use of other optical interfaces such as leadframes and the like are also possible for transferring optical signals to/from the VCSELs and photodiodes on the PCBA 40 as known in the art.

Figure 3:
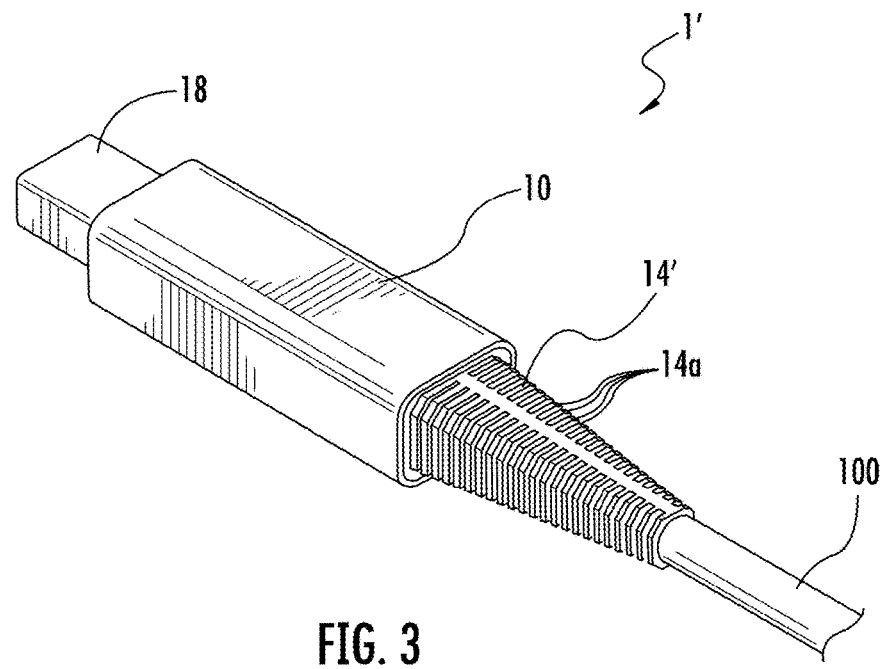
FIG. 3 is a perspective view of another active optical cable assembly having a boot with a plurality of fins for dissipating heat from the connector.

Other variations of the AOC assembly are possible for dissipating a heat transfer rate such as 0.75 Watts or greater from the connector according to the concepts disclosed. Illustratively, FIG. 3 is a perspective view of another AOC assembly 1' having a boot that is similar to AOC assembly 1. AOC assembly 1' includes a boot 14' with a plurality of fins 14a for dissipating heat from the connector like AOC assembly 1. However, boot 14' has a non-round profile and that tapers toward the end that provides better bend relief for fiber optic cable 100. Connector 10 may also have a similar interior structure with a thermal insert 12 disposed under the boot 14' if desired. However, AOC assembly 1' may be used without the thermal insert under the boot, but instead could have a relatively large surface area provided by the boot 14' with a suitable heat transfer characteristic for conducting heat out of the AOC assembly 1'.

Figure 4:
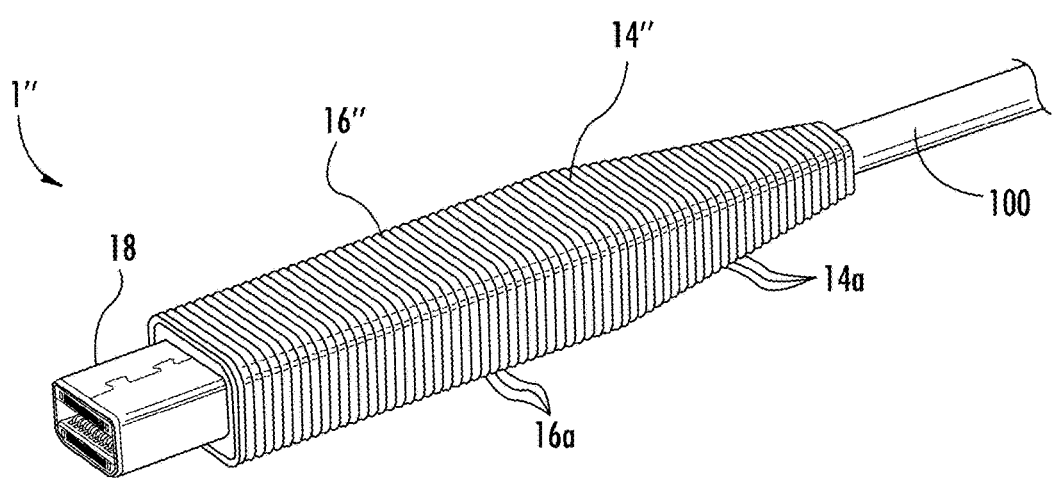
FIG. 4 is a perspective view of yet another active optical cable assembly having both a boot and a connector body with a plurality of fins for dissipating heat from the connector.

Still other variations of the connector are possible for dissipating a suitable heat energy from the connector of the AOC assembly. By way of example, FIG. 4 is a perspective view of yet another AOC assembly 1" that may have a have a heat transfer rate of 0.75 Watts or greater from the connector the assembly according to the concepts disclosed. In this embodiment, AOC assembly 1" has both a boot 14" and a connector body 16" with a respective plurality of fins for dissipating heat from the connector. Specifically, boot 14" has a plurality of fins 14a along its length and is non-round with outer dimensions that generally decrease toward the cable 100. Likewise, connector body 16" has a plurality of fins 16a that extend along its length for dissipating heat from the connector. In this particular embodiment, connector body 16" and boot 14" are overmolded as a common part, but other embodiments can have connector body 16" and boot 14" formed as separate components. Although this embodiment is shown with both the connector body and boot having fins, embodiments can have fins only the connector body (i.e., at least one component of the connector) such as was modeled as Design 8 in Table 4, while still providing suitable heat transfer characteristics. Other variations having a connector body 16" with fins 16a also provides less surface area for the user to contact when disconnecting the AOC assembly 1" from a device so that the connector will feel cooler to the touch. As shown, both the boot and the connector body (e.g., the at least one component of the connector) are disposed at least partially outward of a housing of the connector.

Many different types of materials may be used for the heat dissipating components disclosed herein. For example, many materials such as metals are well-known thermal conductors that may be suitable for the thermal insert. On the other hand, polymers are typically thought of as thermal insulators (≤0.2 W/m ° K), but their thermal conductivity performance may be improved by the addition of fillers such as metals, ceramics, carbon fiber, or carbon black. Formulated thermoplastic resins which are thermally conductive are commercially available. The resins most commonly used for these applications are filled polyphenylene sulfide (PPS, a high heat stable resin), liquid crystalline polymers (LCP, also thermally stable), nylon (intermediate thermal stability resin), or polypropylene or polyethylene (PP or PE respectively, lower thermal stability resins). However a few thermally conductive polymers made from polycarbonate (PC) or polybutylenetere (PBT) are also available.

Examples of materials for boot 14 and/or connector body 16 and their properties are provided in Tables 1 and 2. Companies that may provide suitable polymers are Encap, Cool Polymers, Ovation Polymers, SABIC polymers, RTP corporation Epic polymers, and PolyOne Corp. Table 1 below lists representative properties for the most common polyphenylene sulfide (PPS) materials and Table 2 for polypropylenes (PP) and nylon materials as listed in "Thennally Conductive Plastics" by G. Neal and J. M. Finan. Any of the materials discussed may be used for the boot and/or connector body as desired for achieving the desired thermal performance characteristics so long as the other desired mechanical performance characteristics are met such as strength, ruggedness, bending, and the like.

Generally speaking, Tables 1 and 2 list materials including specific levels of fillers such as glass, ceramics and/or carbons that have improved thermal performance characteristics compared with non-filled materials; however, materials having other types or percentages of fillers or little to no fillers may be used with the concepts disclosed herein. As may be observed in Tables 1 and 2, the physical properties of the materials are affected by the addition of the thermally conductive ceramic and frequently result in an increase in modulus and strength, but a reduction in elongation.

TABLE 1

Material Properties for PPS Composites

|  | PPS (10% glass) | PPS (10% glass) w/ceramic filler | PPS (10% glass) w/carbon fiber |
|---|---|---|---|
| Thermal Conductivity (W/m ° K) through plane | 0.3 | 1.0 | 1.0 |
| Thermal Conductivity (W/m ° K) in plane | — | 1.0 | 7.0 |
| Surface Resistivity (ohms/sq) | >$10^{13}$ | >$10^{13}$ | $5.4 \times 10^2$ |
| Tensile Strength (MPa) | 79.4 | 52.4 | 138.7 |
| Tensile Elongation (%) | 3.0 | 0.5 | 1.0 |
| Flexural Strength (MPa) | 103.5 | 80.0 | 179.4 |
| Flexural Modulus (MPa) | 6,210 | 14,835 | 27,600 |
| Notched Izod (J/m) | 48.0 | 16.0 | 32.0 |

TABLE 2

Physical Properties for Nylon and Polypropylene Materials

|  | Nylon (10% glass) | Nylon (10% glass) w/ceramic filler | Poly-propylene | Poly-propylene w/ceramic filler |
|---|---|---|---|---|
| Thermal Conductivity (W/m ° K) | 0.2 | 1.0 | 0.2 | 1.2 |
| Tensile Strength (MPa) | 93.2 | 93.1 | 34.5 | 17.3 |
| Tensile Elongation (%) | 3.0 | 2.3 | >200 | 1.5 |
| Flexural Strength (MPa) | 117.0 | 152.0 | 548.3 | 36.6 |
| Flexural Modulus (MPa) | 4,485 | 9,246 | 1,242 | 4,278 |
| Notched Izod (J/m) | 53.4 | 53.4 | 21.4 | 16.0 |

Of course, materials for the boot and/or connector body may be tailored by selecting the specific filler(s) and/or percentage(s) for the providing the desired balance of mechanical and thermal properties and the example materials in the Tables are merely demonstrate how material properties change when fillers are added. Moreover, the specific filler used may affect the coefficient of thermal expansion (CTE). By way of example, in the case of materials with ceramic powders or metallic fillers the CTE may approach the value for the pure inorganic filler CTE, while in the case of carbon black or carbon fiber there is little to no change in CTE of the material.

Still other materials may be used for the boot and/or connector body that have improved thermal characteristics but still provide the desires mechanical properties and allows injection molding. Examples of such materials of are the CoolPoly D series of thermally conductive plastics available from Cool Polymers, Inc. of North Kingstown, R.I. or a filled material such as LCP E540i available from Ticona VECTRA. Illustratively, Table 3 lists thermal properties for a specific PPS blend available from Cool Polymers, Inc. of North Kingstown, R.I., but the use of other suitable thermally conductive PPS blends or materials are possible.

TABLE 3

Cool Polymers ® PPS Blend

|  | Thermal Value | Testing Standard |
|---|---|---|
| Thermal Conductivity | 6 W/m ° K | ASTM E1461 |
| Thermal Diffusivity | 0.0353 $cm^2$/sec | ASTM E1461 |
| Specific Heat | 0.949 J/g ° C. | ASTM E1461 |

Figure 5:
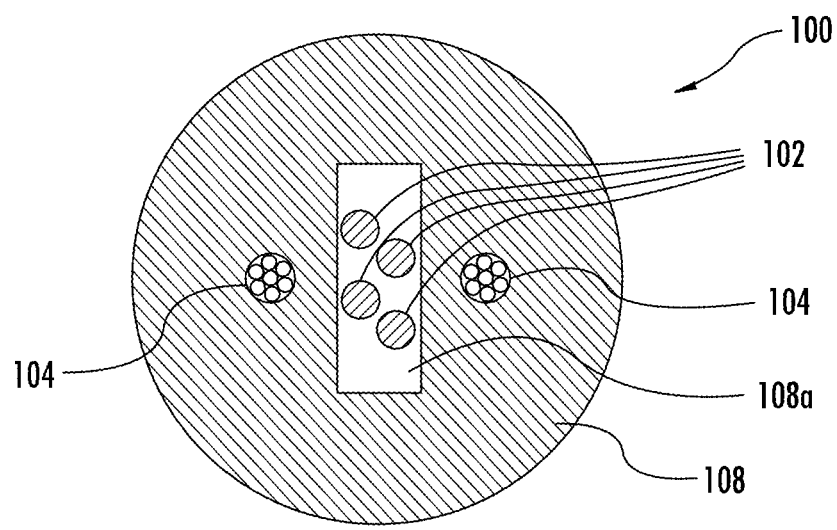
FIGS. 5 and 6 respectively are cross-sectional and perspective views of a fiber optic cable used on active optical cable assemblies that were subject to finite element analysis.
Figure 6:
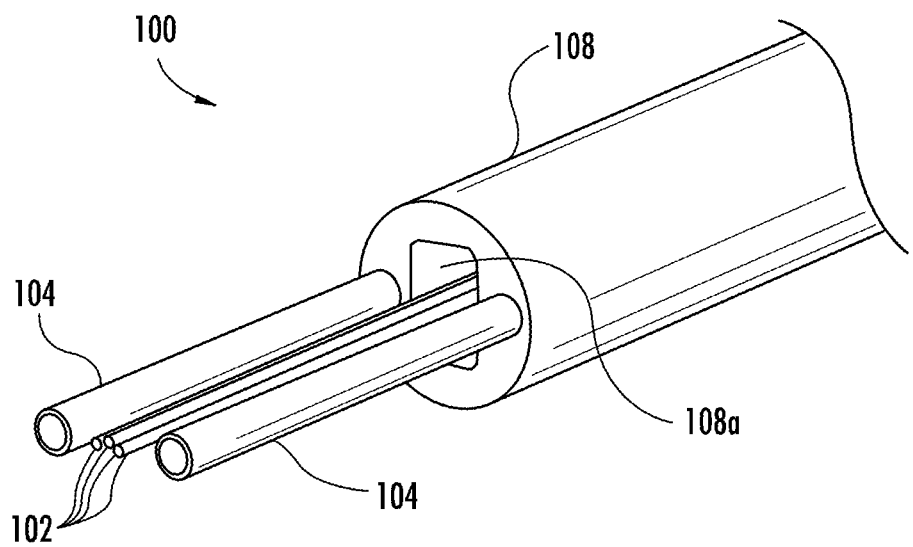

FIGS. 5 and 6 respectively are cross-sectional and perspective views of a non-limiting example of fiber optic cable 100 showing internal cable components for explanatory purposes. The fiber optic optical cable 100 depicted may be configured as the optical cable used for the AOC assemblies depicted, but it should be understood that other optical cable configurations may be utilized. The fiber optic cable 100 includes a polymer jacket 108 having an outer periphery and an inner periphery, with the inner periphery defining a slot 108*a*. The slot 108*a* acts as an optical fiber envelope for one or more optical fibers 102. In this cable embodiment, the polymer jacket 108 defines the slot 108*a* that longitudinally extends the entire length of the fiber optic cable 100, but other embodiments of cable may have a tube or other component as the optical fiber envelope if desired.

Individual buffered optical fibers 102 are disposed within the slot 108*a*, but the optical fibers 102 may be arranged as a ribbon, bare optical fibers, or the like within the fiber optic cable 100. The optical fibers 102 may be configured to transmit optical signals back and forth along fiber optic cable 100 between connectors 10 disposed on one or more ends. Any suitable number of optical fibers 102 may be included in the slot 108a. The optical fibers 102 are free to translate within the slot 108a when the fiber optic cable 100 is bent. The shape of the slot 108a may be established so that no matter how the fiber optic cable 100 is bent, the optical fibers 102 will never be bent below their minimum bend radius. Although the slot 108a is illustrated as rectangular, the shape and orientation of the slot 108a may also depend on the preferred bending and locations of other elements within the fiber optic cable 100.

In some embodiments, particularly AOC assemblies configured for providing electrical power, one or more conductors may be disposed within the fiber optic cable 100. For example, the conductors may be disposed within the slot 108a and span the entire length of the fiber optic cable 100. In other embodiments, the conductors may be arranged within the polymer jacket 108 (e.g., the first and second strength members 104, 104 have dual-functions as described below).

In the illustrated embodiment, the fiber optic cable 100 further includes a first strength element 104 and a second strength element 104 disposed within the polymer jacket 108 to provide increased rigidity to the fiber optic cable 100, and inhibit the optical fibers 102 from bending below their minimum bend radius. More or fewer strength elements may be utilized if desired. The first and second strength members 104, 104 may be any suitable material, such as, but not limited to, stranded stainless steel, copper, and aramid fibers (e.g., Kevlar, fiberglass, and the like). In some embodiments, the first strength element 104 and the second strength element 104 are electrically conductive and act as the electrical conductors described above to provide electrical power and/or data across the fiber optic cable 100 and may or may not have individual dielectric coatings thereon. The first and second strength elements 104, 104 may also be used to secure the fiber optic cable 100 to a cable attachment member such as collar 30 of the connector 10 such as in the representative example shown herein. For example, the first and second strength elements 104, 104 may metal and coupled/attached to an inner portion of the collar that fits with an outer portion of the collar for cable attachment and providing strain-relief.

Extensive thermal modeling using finite element (FE) analysis was conducted to validate and thermally test the concepts for different embodiments disclosed. The thermal modeling performed in Table 4 is directed to baseline designs along with embodiments having one or more components with a plurality of fins. The thermal modeling represented in Table 4 used the maximum flow of thermal power to environment that occurs when the surface of the assembly is closest to an isothermal condition. Several of the baseline designs in Table 4 used theoretical designs for determining best case performance for comparisons with the present designs according to the concepts disclosed. It is possible that the best thermal designs may conflict with the product aesthetics, but a balance may be achieved by the selection of suitable materials and thermal flow paths in the connector structure.

Table 4 shown below shows the temperature in degrees Celsius for eight different AOC assemblies at the clock and data recovery (CDR) chip and integrated circuit (IC) along with the temperatures on the same three surfaces and the front snout (i.e., Surf1, Surf 2, Surf3, and Snout) for each of the eight different assemblies modeled using finite element (FE) analysis. The snout is the metal shell portion of the connector that extends from the front of the connector and is plugged into the host device. A baseline AOC assembly (Design 3) was modeled along with a variation on the baseline AOC assembly using a theoretical cable design (Design 3CC) to show and compare thermal performance using a cable variation on the baseline cable assembly. Additionally, an alternate baseline AOC assembly (Design 3A) was also subjected to FE analysis. Further variations on the baseline assembly analysis (Designs 4, Design 4A and Design 4CC) were also performed for understanding and analyzing heat dissipation effects when varying the design. AOC assemblies using the concepts disclosed herein were also modeled such as using a finned connector housing (design 8) and a finned boot (design 9) for improving the heat dissipation characteristics for the AOC assembly and maintaining the temperature around a predetermined value to show the validity and advantages of the disclosed concepts.

All of the thermal modeling for the different designs used the following thermal management assumptions and/or rules for the FE analysis. The cooling environment was still air at 35° C. with the thermal transfer to and from the host device block; in reality, the blocking the thermal transfer to the host device is only true if the connector and the host device are at the same temperature. The power (i.e., thermal) sources of the connector are located on the same printed circuit board assembly (PCBA) of the optical engine with the following values: 0.7 W distributed uniformly throughout the CDR; and 0.4 W distributed uniformly throughout the IC; and no thermal power from any other source. Acceptable thermal solutions for the modeled AOC assemblies were deemed to have: the temperatures for the CDR and IC at or below 90° C.; the body of the connector is at or below a predetermined temperature of about 60° C.; and the VCSELs are held at or below a given temperature for reliable operation.

Other thermal model specifics and/or assumptions were also employed for the thermal modeling in Table 4 to simply the FE analysis, unless stated otherwise. A simplified part geometry was used for the thermal models and internal conductive paths were used. The thermal models used natural convention from the external surfaces of the assembly such as the connector body, snout, boot and cable and also included the temperature dependent properties of air and external radiative transfer. Not included or considered in the thermal modeling was the temperature dependent properties of solids, edge interactions of convective plumes, transient conditions, on finned assemblies the fin interaction was not modeled and only pure silicon was modeled for the IC and CDR bodies.

The thermal models of the disclosed concepts with one or more components having a plurality of fins (Designs 8 and 9) were a good representation of physical reality and confirmed that the concepts disclosed herein are effective for improving heat dissipation from AOC assemblies and were also experimentally validated. The thermal modeling of these designs suggested that three practical choices are possible that are used separately or in combination for transferring heat from the AOC assembly: (1) use the area available in cable for improved heat dissipation; (2) add surface area (i.e, fins) to the connector housing (i.e., tube) for improved heat dissipation; and/or (3) add surface area (i.e., fins) to the boot for improving heat dissipation. Other ways of improving heat dissipation may be possible, but may not be practical such as adding perforations to the shell (which may have EMI and EMF concerns) and/or forced convention, which may not be available or practical. Table 4 shows the thermal results in degree Celsius for the FE analysis performed on the eight different models. As shown in Table 4, some of the designs descriptions included an asterisk indicating that the air spaces were modeled as copper for FE analysis to improve heat transfer, which is not a realistic design option, but instead done to understand the most optimistic performance of the design.

TABLE 4

FE Analysis Results for the eight different models

| | | | | Temperature, ° C. | | | | |
|---|---|---|---|---|---|---|---|---|
| | Baseline | Baseline + Copper Cable | Alternative Baseline | Baseline + Copper Connector & Boot* | Copper Connector & Boot* | Baseline + All Copper* | Finned Tube (connector body) | Finned Boot |
| Design | 3 | 3CC | 3A | 4 | 4A | 4CC | 8 | 9 |
| CDR | 87.7 | 78.1 | 85.6 | 71.4 | 68.6 | 58.4 | 71.7 | 71.0 |
| IC | 90.9 | 81.1 | 88.8 | 71.5 | 68.7 | 58.5 | 75.5 | 74.0 |
| Surf1 | 73.2 | 64.2 | 71.3 | 71.3 | 68.5 | 58.3 | 59.8 | 60.1 |
| Surf2 | 72.9 | 64.0 | 71.0 | 71.3 | 68.5 | 58.3 | 59.6 | 60.0 |
| Surf3 | 73.0 | 64.0 | 71.1 | 71.3 | 68.5 | 58.3 | 60.0 | 60.3 |
| Snout | 72.9 | 64.0 | 71.0 | 71.3 | 68.5 | 58.3 | 59.2 | 60.0 |

*Copper configurations include air spaces simulated as copper

Design 3 represents the baseline modeling of an AOC assembly having a connector with the housing surrounded by a conventional connector body and boot along with fiber optic cable 100. All of the temperature values in Table 4 are steady-state temperatures using the modeling conditions discussed herein. As shown, the Design 3 had steady-state surface and snout temperatures of about 73° C. on the connector, which is an elevated temperature that may cause design concerns and/or be uncomfortable for the user. The baseline design was also modeled using different fiber optic cable designs to determine the affect a different cable would have on thermal performance of the baseline design. By way of example, Design 3CC is a theoretical design that represents the baseline connector using a copper cable to represent a best case heat transfer from the baseline connector to the fiber optic cable. Design 3CC had steady-state surface and snout temperatures of about 64° C. on the connector, which still does not achieve the desired thermal performance. Design 3A is another alternate baseline design using a realistic cable design similar to fiber optic cable 100, but further including a copper braid on a cable having an outer diameter of about 3.4 millimeters that was attached to a back end of the connector from heat transfer from the connector. Design 3A had steady-state surface and snout temperatures of about 71° C. on the connector surfaces, which still relatively warm and does not achieve the desired thermal performance. Thus, improved thermal performance using the baseline connector with different cable designs will not yield the desired thermal performance and other designs are necessary.

Figure 7:
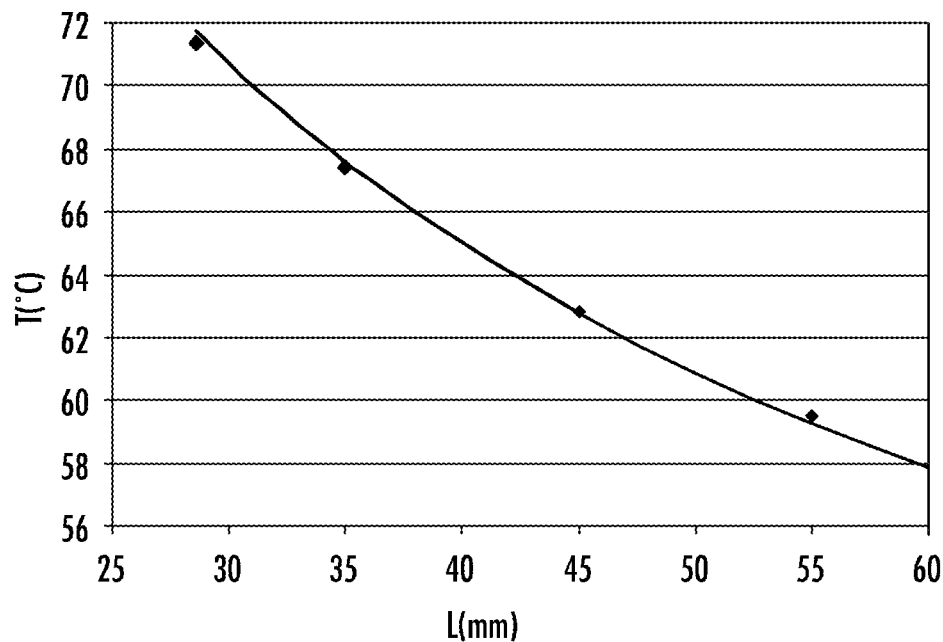
FIG. 7 is a graph showing the body surface temperature of the connector as a function of the connector length for a specific design.

FE analysis was conducted to evaluate other design parameters directed to the connector. Design 4 was performed as an isothermal check using the baseline connector design having a conventional housing body and boot with solid copper internals to determine the thermal performance that may be possible as denoted by the asterisk. Design 4 had steady-state surface and snout temperatures of about 71° C. on the connector surfaces, which still relatively warm and does not achieve the desired thennal performance. Further modeling was conducted to determine how the length of the connector (i.e., connector housing, etc.) affects the thermal performance of Design 4. FIG. 7 is a graph showing the surface temperature of the connector for Design 4 as a function of connector length. As shown, the values listed in Table 4 represent a connector length slightly less than 30 millimeter and as the length of the connector increases the surface temperatures decrease. From FIG. 7, the connector temperatures for this model will not approach the desired range until the length of the connector is about 53 millimeters or longer. However, larger/longer connectors in this range are not desirable for use with the electronics devices and consequently are not a suitable option for improving thermal performance characteristics in AOC assemblies. Design 4A is another thermal model variation of the baseline design representing a forced isothermal case having all of the connector internals made of copper, which is not a realistic option. Likewise, Design 4CC is a theoretical design representing the baseline connector having all copper connector internals along with an all copper fiber optic cable to represent a best case heat transfer from the baseline connector to the cable, the design steady-state surface and snout temperatures of about 58° C. Thus, the FE modeling revealed that other designs are necessary to dissipate the heat at the desired levels to achieve a steady-state temperature of about 60° C. or less on the connector surfaces of the AOC assembly.

Designs 8 and 9 represent designs having a component with a plurality of fins using concepts of the present application. Specifically, Design 8 is the same as the baseline design, except that only the connector body includes a plurality of fins for dissipating thermal energy (i.e., heat flux) from the connector. As shown in Table 4, Design 8 had steady-state surface and snout temperatures of about 60° C. on the connector, which is significantly lower temperature than for the baseline case (Design 3). Simply stated, Design 8 using the connector body with a plurality of fins allowed a decrease of about 12° C. compared with the baseline Design 3 by using the concepts disclosed herein. Likewise, Design 9 is the same as the baseline design, except that only the boot includes a plurality of fins for dissipating thermal energy along with a thermal insert disposed under the boot from the connector. The thermal insert provides enhanced axial transport of thermal energy (i.e., heat flux) from the connector. As shown in Table 4, Design 9 had steady-state surface and snout temperatures of about 60° C. on the connector, which is also significantly lower temperature than for the baseline case (Design 3). Thus, the FE modeling confirmed that the concepts disclosed provide a significant thermal improvements for AOC assemblies.

Figure 8:
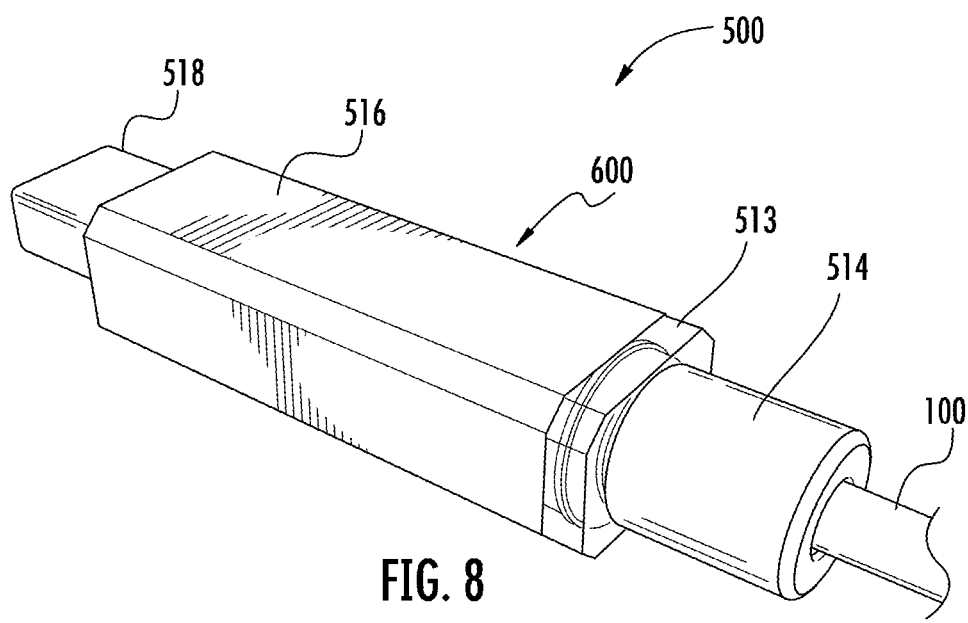
FIG. 8 is an assembled rear perspective view of another active optical cable assembly having features for dissipating heat from the connector according to the concepts disclosed herein.
Figure 9:
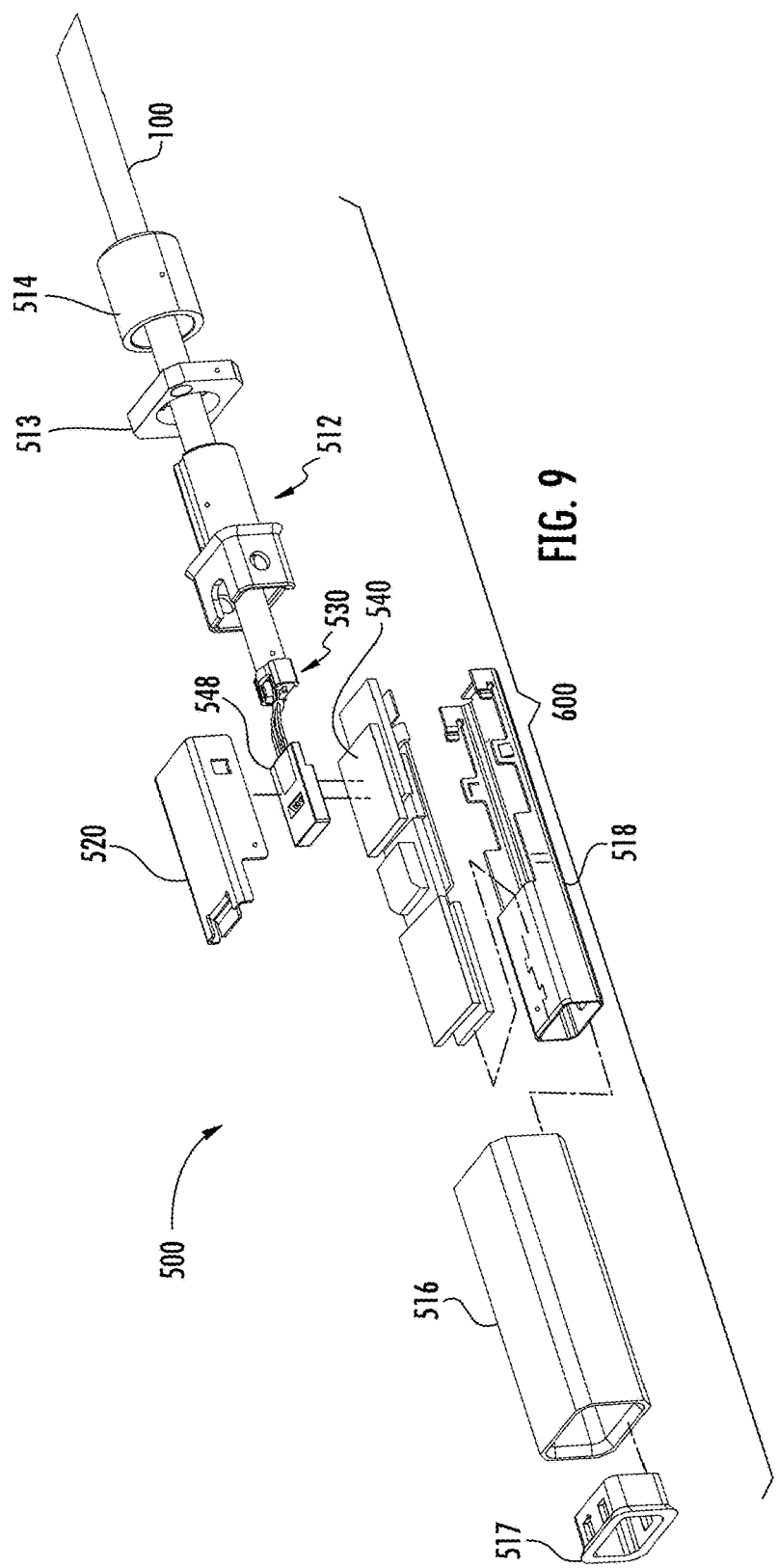
FIG. 9 is a partially exploded view of the active optical cable assembly of FIG. 8.

Still other designs are possible for achieving an improved heat transfer rate from the connector of an AOC assembly using a thermal insert without the use of a component with a plurality of fins. By way of example, FIG. 8 is an assembled rear perspective view of AOC assembly 500 having a thermal insert 512 (not visible) for dissipating heat from the connector according to the concepts disclosed herein. FIG. 9 is a partially exploded view of AOC assembly 500 having a fiber optic cable 100 attached to a connector 600 that may have a suitable heat transfer rate of 0.75 Watts or greater from the connector 600. In this embodiment, a thermal insert 512 (FIG. 9) is used for promoting heat transfer from the connector; however, none of the components of connector 600 use a plurality of fins for improving thermal performance like other embodiments. Connector 600 includes the housing formed by a first housing portion 518 and a second housing portion 520 that are partially disposed under a connector body 516 when assembled. The heat generating components of connector 600 are disposed within the housing and are disposed on a printed circuit board assembly (PCBA) 540. The heat generating components on the PCBA 540 can include one or more active electrical components such as vertical-cavity surface emitting lasers (VCSELs) and integrated circuits (ICs) such as laser drivers, clock and data recovery ICs, transceivers, and the like. Significant heat energy can be generated by these active components during operation and can cause elevated temperatures for the connector if the heat energy is not dissipated. By way of example, the active electrical components can easily cause a heat flux of 0.75 Watts or more inside the connector 600. Additionally, the front end of the connector 600 includes an electrical interface that is electrically attached to the PCBA 540 for electrical connection to a device and positioned using a nosepiece 517 that fits into the front end of connector body 516. At the rear end of the connector 600, fiber optic cable 100 has its strength members 104 attached to a collar 30' and optical fibers 102 are attached to an optical interface such as a total-internal reflection (TIR) block 548 at a first end of the fiber optic cable. The use of other optical interfaces such as leadframes and the like are also possible for transferring optical signals to/from the VCSELs and photodiodes on the PCBA 540 as known in the art.

FIG. 10 is a cross-sectional view of an AOC assembly 500' similar to AOC assembly 500 depicting additional features for dissipating heat from the connector according to the concepts disclosed herein. Specifically, AOC assembly 500' includes thermal pads 519 (a.k.a., thermal gap pad) that provide a thermal bridge between the active components and a portion of the housing. As shown, the thermal pads 519 are in close proximity to heat generating components and a portion of the housing and may use a thermal paste on one or more sides for improving heat transfer. Likewise, AOC assemblies may also include other components such as one or more thermal shims 521 (e.g., a thermal strip such as copper or the like) within the connector for providing a thermal bridge for conducting heat from the connector.

Figure 11:
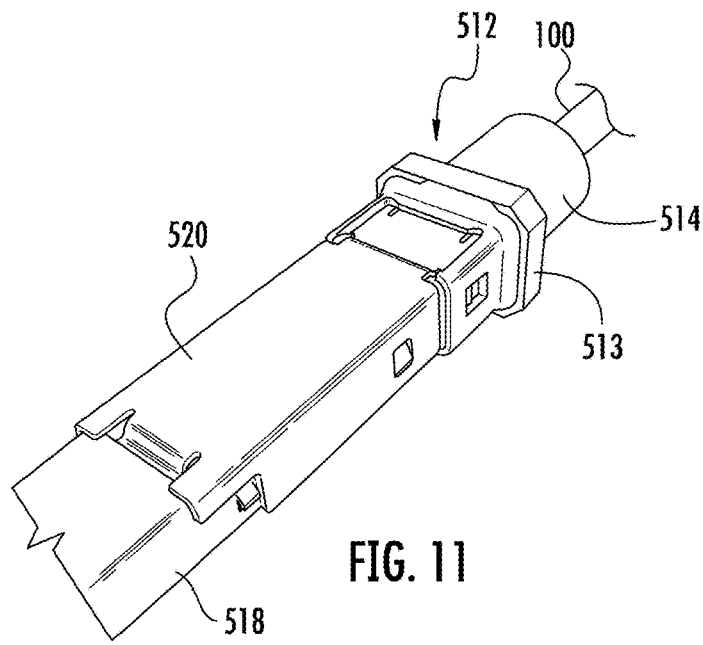
FIGS. 11-13 are partially assembled views of portions of the active optical cable assembly of FIGS. 8 and 9 with the connector body removed for showing the thermal insert attached to the housing for dissipating heat energy from the connector.
Figure 12:
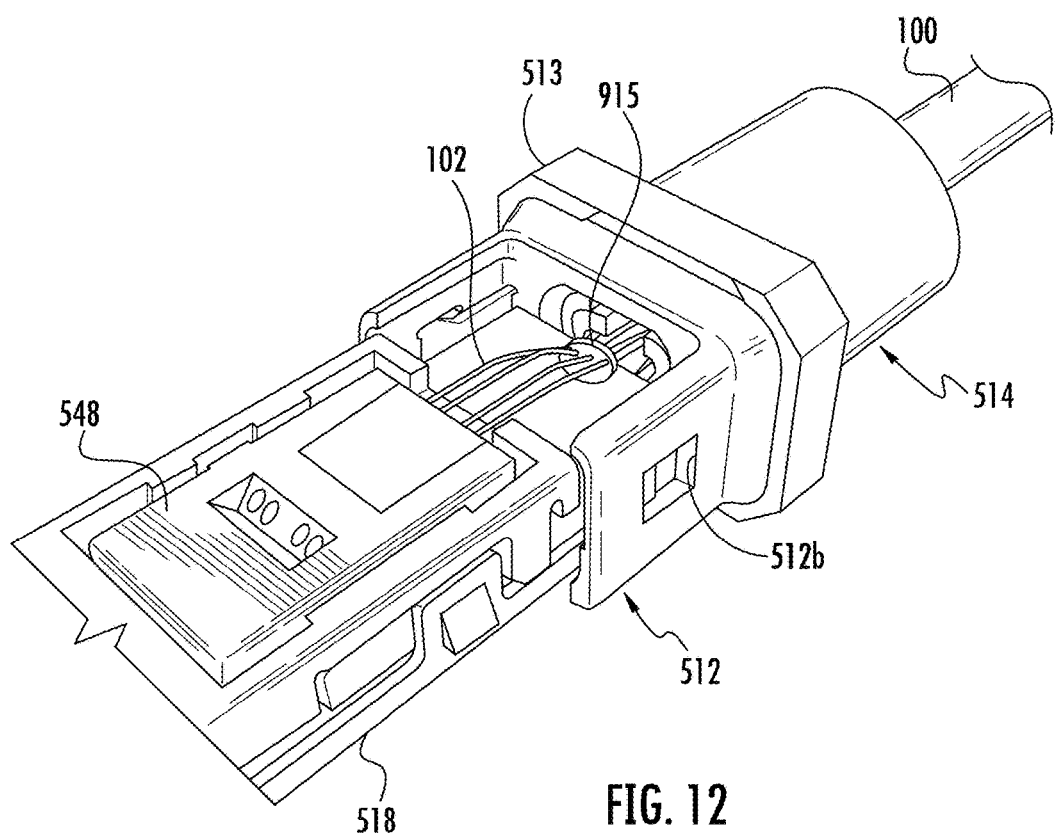
Figure 13:
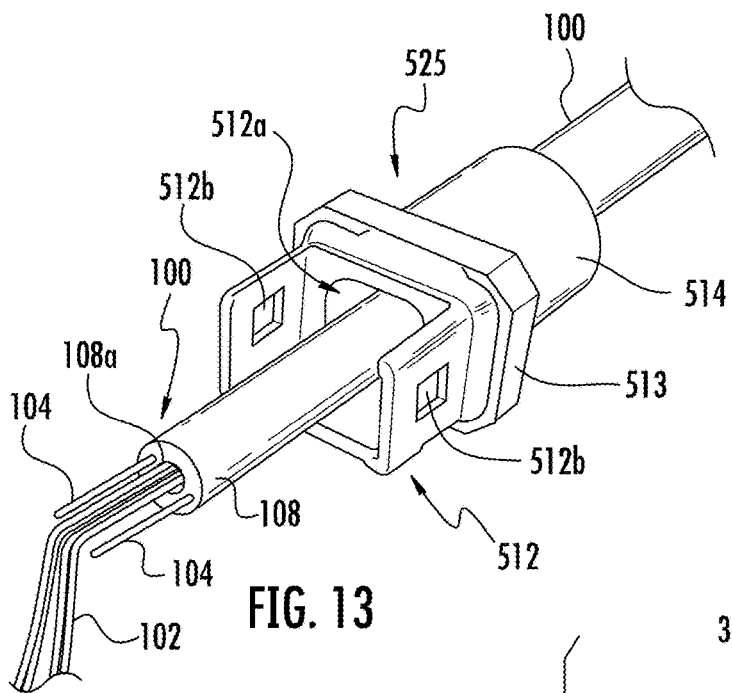

As best shown in FIGS. 11 and 12, when assembled a front portion of thermal insert 512 attaches to the housing of connector 600 that is formed from a first housing portion 518 and a second housing portion 520, thereby creating a thermal path between the housing 518,520 and thermal insert 512. FIG. 13 shows a view of the fiber optic cable 100 threaded through the thermal insert 512 before attachment to the cable. Thermal insert 512 includes a passageway 512a extending from the front to the rear and attaches to the housing via one or more windows 512b but other attachment features are possible such as a friction fit, fasteners, etc. A rear portion of thermal insert 512 has a round-profile with such as cylindrical shape that extends through end cap 513 and has at least a portion disposed under a boot 514 as shown. Further, an optional thermal paste (not visible) may be applied between the housing 518,520 and thermal insert 512 for further improving the thermal path and the transfer of heat energy to the thermal insert 512, thereby improving thermal performance. FIG. 12 is a partially assembled view of the active optical cable assembly of FIG. 11 with the second housing portion 520 removed for showing internal details.

Figure 14:
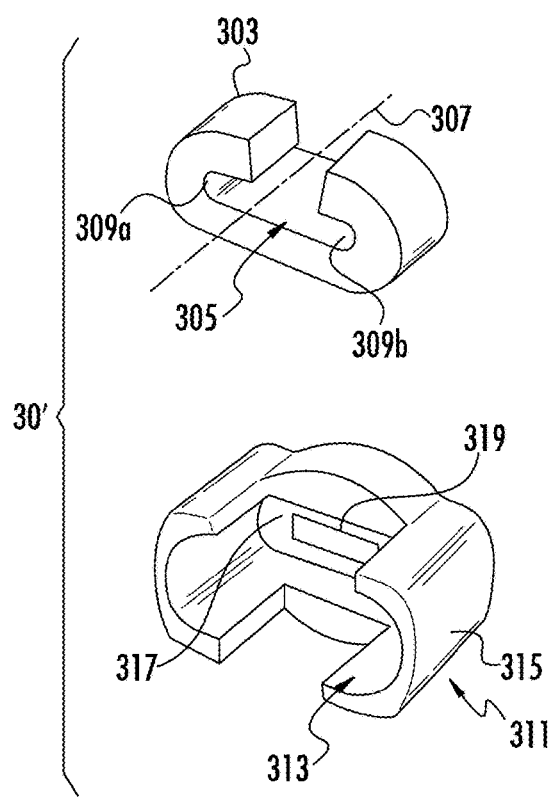
FIGS. 14 and 15 respectively are perspective exploded and assembled views showing the collar used for securing the fiber optic cable of the active optical cable assembly of FIGS. 8 and 9.
Figure 15:
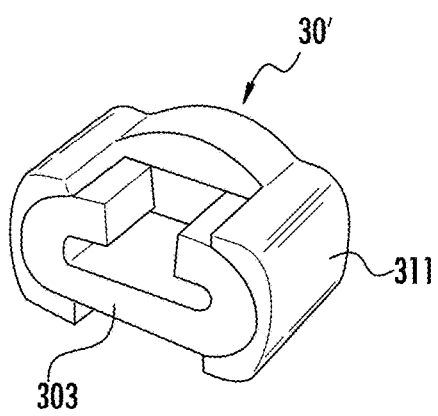
Figure 16:
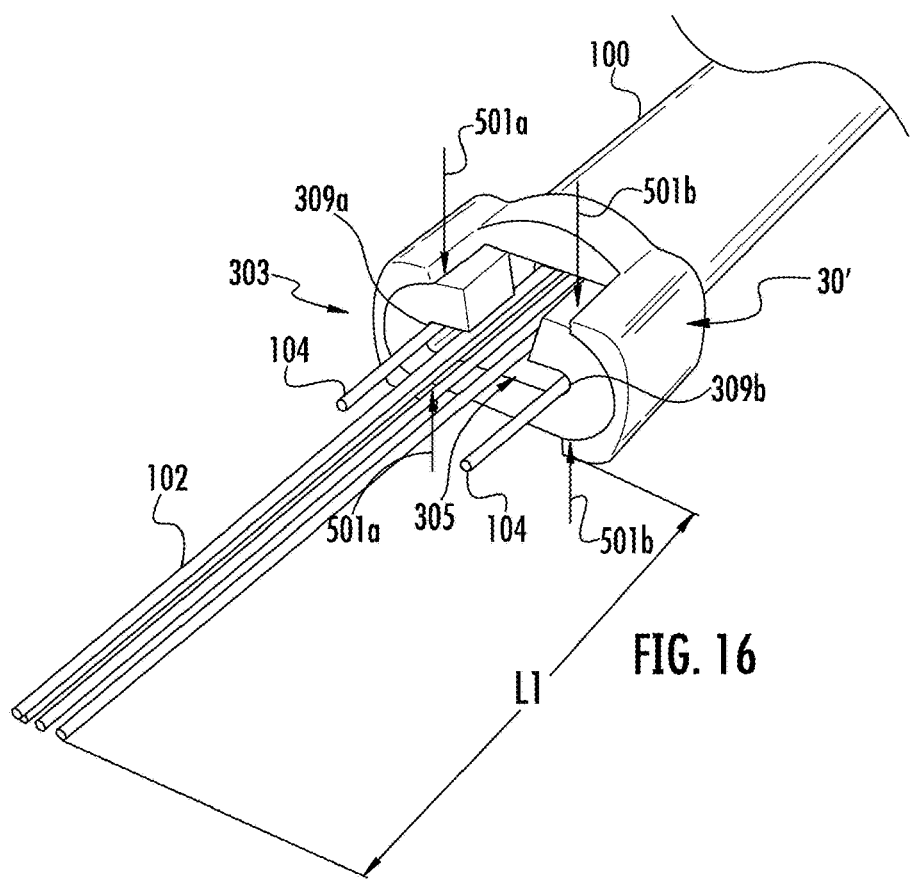
FIGS. 16-19 are partial assembly views showing details for making the sub-assembly of the active optical cable assembly of FIGS. 8 and 9 having the thermal insert.
Figure 17:
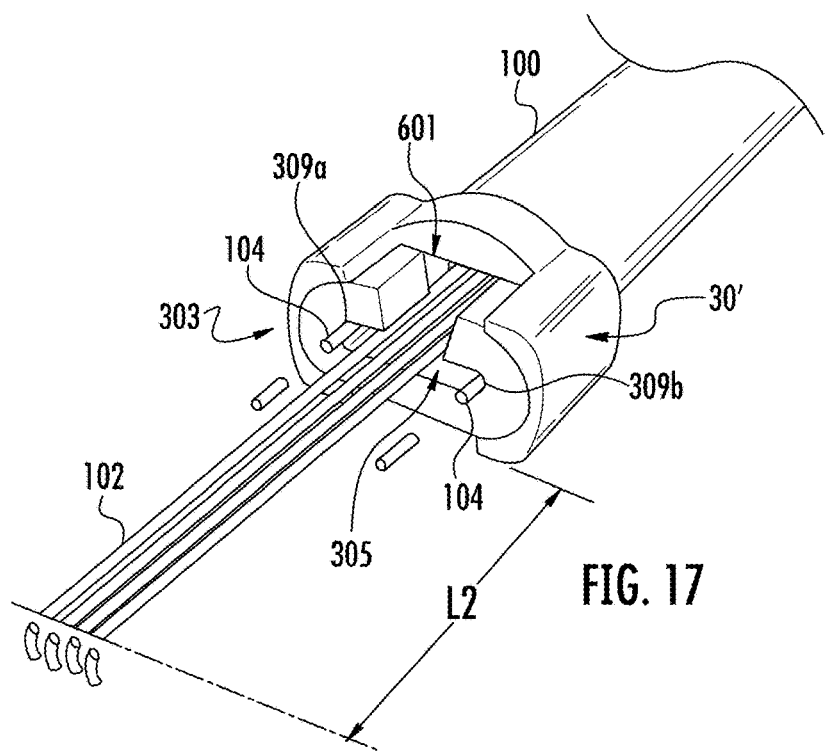

FIGS. 14 and 15 respectively are perspective exploded and assembled views showing the components of collar 30' used for securing the fiber optic cable 100 to connector 600. As shown, collar 30' includes an inner portion 301 and an outer portion 311. Inner portion 303 defines a slot 305 extending along an insertion axis 307 of the inner portion 303. In this embodiment, the slot 305 is configured as an oblong axial slot, but the slot can have any suitable shape as desired. Slot 305 includes opposite radial end portions 309a,309b that may be beneficial for receiving and securing strength members 104,104 of fiber optic cable 100 such as shown in FIGS. 16 and 17 and discussed below. Outer portion 311 includes a cavity 313 shaped for receiving the inner portion 303 when assembled such as shown in FIG. 15. Cavity 313 is generally aligned along the longitudinal axis (i.e., aligned with the axis of the connector) and has a socket-like shape, but the cavity can have other arrangements such as in a direction that is transverse with the longitudinal axis. Outer portion 311 includes a side wall 315 and a back wall 317 that includes a passageway 319 for optical fibers 102 and the strength members 104 to pass through. The collar 30' may be formed from any suitable materials. In one embodiment, the inner portion 303 is a conductive material and the outer portion 311 is a dielectric material for electrically insulating metal elongate members (e.g., such as metal strength members, but they may have other functions such as carrying signals) from the housing of the connector when assembled; however, other materials are possible as desired.

Attaching the strength members 104 to inner portion 303 may be accomplished in any suitable manner depending on the material of the strength member. For instance, if the strength members 104 are metal, then it may be possible to weld the ends to inner portion 303 if the inner portion 303 is also metal. Other possible examples of attachment of the strength members 104 to the inner portion 303 may include the use of adhesives, fasteners, clamping, or other attachment procedures such as crimping as discussed below.

Figure 18:
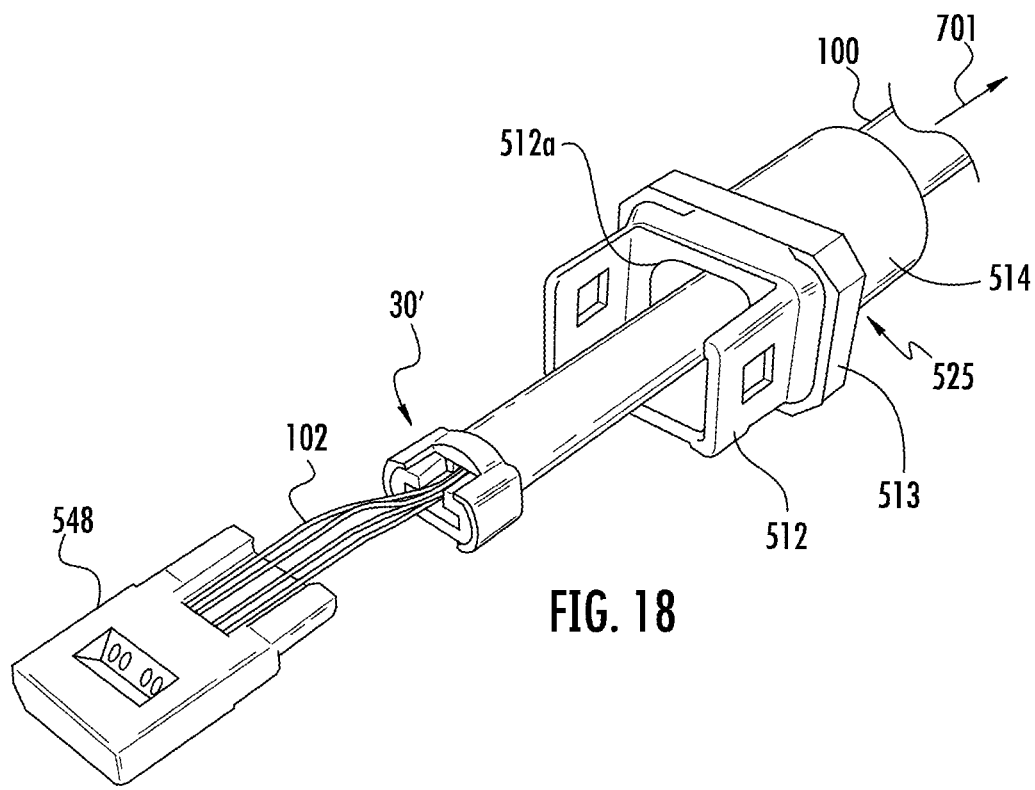
Figure 19:
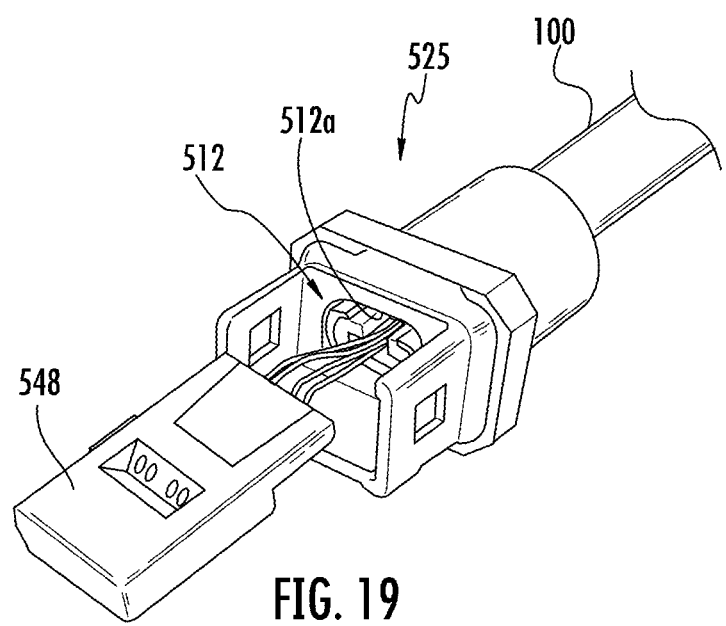

FIGS. 16-19 are partial assembly views showing details for making an explanatory sub-assembly 525 of AOC assembly 500 shown in FIG. 19. Subassembly 525 may be prepared and mated to a connector sub-assembly later in the manufacturing process. In this embodiment, inner collar 303 is formed from a deformable material such as a metal and the strength members 104 of the fiber optic cable 100 are attached by deforming the inner collar 303 about a portion of the strength members 104. Any desired parts located behind the collar 30' may be threaded onto fiber optic cable 100 such as thermal insert 512, end cap 513, and/or boot 514 (FIG. 18) along with preparing the end of the cable by exposing the strength members 104 and optical fibers so they are ready for further assembly. FIG. 16 shows the strength members 104 and optical fibers routed through passageway 319 of outer portion 311 and disposed in end portions 309a,309b of the inner portion 303 of collar 30'.

Fiber optic cable 100 is prepared so that optical fibers 102 extend a suitable distance L1 beyond the collar 30'. The strength members 104 are secured to the inner portion 303 by the application of opposite pairs of force vectors 501a, 501b to deform end portions of the inner portion 303, thereby forming a crimped attachment that may rigidly and fixedly grip the end portions of the strength members 104. FIG. 17 depicts cutting any excess length of strength members 104 from the ends along with trimming the optical fibers 102 to a desired length L2. Any suitable method may be used for trimming the optical fibers such as laser and/or mechanical processing. Additionally, coatings may be removed from portions of the optical fiber as desired.

FIG. 18 shows an optical module 548 such as a TIR block attached to the ends of optical fibers 102 for forming sub-assembly 525 of AOC assembly 500. FIG. 19 depicts the collar 30' retracted relative to the thermal insert 512 so it is seated within a pocket of passageway 512a. The pocket may be shaped to closely receive collar 30' and inhibit relative movement between the collar 30' and the thermal insert 512. By way of example, the pocket has an oblong shape for receiving the oblong periphery of the collar 30'. End cap 513 and the boot 514 are slid onto the back end of thermal insert 512. At least a portion of the thermal insert 512 is disposed under the boot 514 for inhibiting direct touching of the thermal insert 512 by the user when assembled. When completed the sub-assembly 525 may be aligned and attached to the connector sub-assembly so that the optical channels of optical module 548 are suitably aligned with the active components such as the VCSELs and photodiodes on the PCBA 540 for transmitting/receiving signals. The thermal insert 512 is also attached to a portion of connector housing. For instance, the thermal insert 512 may be attached to the first housing portion 518 using windows 512b as shown in FIG. 12. A thermal paste may be applied between the thermal insert 512 and connector housing for improving heat transfer characteristics.

Designs similar to AOC assemblies 500 and 500' were modeled for thermal performance using FE analysis to validate and thermally test the concepts for different embodiments disclosed. Specifically, Table 5 shows the thermal results in degree Celsius for the FE analysis performed on the five different variations of AOC assembly 500 having the thermal insert attached to the housing and with a portion of the thermal insert disposed under the boot. The thermal modeling performed in Table 5 is directed to the AOC assembly 500 with varying features, materials and/or components for understanding thermal performance for the design as discussed below. However, the thermal modeling represented in Table 5 also include some different modeling parameters than used in the thermal modeling of Table 4 and the differences will be discussed.

The thermal FE analysis in Table 5 modeled the AOC assemblies with the snout of the connector thermally attached to a host device in a steady-state condition, which is a more realistic case aligned with the usage of the AOC assembly being plugged into a device with the model being matched to empirical data. The AOC assemblies modeled in Table 5 included realistic designs for the FE analysis such as using thermal shims or thermal pads in the modeling as discussed, instead of using all copper connector internals as noted in Table 4 for representing heat transfer from the AOC assembly. Further, the modeling in Table 5 used a different printed circuit board assembly design with a power out of 860 milliWatts.

Table 5 shown below lists the temperature in degrees Celsius for five different AOC assemblies similar to AOC assembly 500 at five different locations, namely, the controller chip, CDR chip, transceiver integrated circuit (TIA), the VCSEL, and the body. All of the temperatures listed are the maximum temperatures at steady-state conditions for the device or location. Thus, only one body surface temperature is provided and the snout temperature is not given since it is modeled as thermally attached to a host device. As shown in Table 5, the AOC assemblies modeled had acceptable thermal performance for both the active components and the body temperature with the variations discussed.

The first AOC assembly (Design A) in Table 5 was modeled using an aluminum thermal insert for AOC assembly 500 with the addition of thermal pads and a thermal shim. Design B was similar to Design A and included thermal pads and thermal shim, but used a polymer material for the thermal insert for determine the impact of a material on thermal performance of the thermal insert. The aluminum was selected for use as the thermal insert material since it has a relatively high thermal conductivity on the order of about 200 W/m ° C., but as shown by Design B other suitable materials such as polymers are possible for the thermal boot in the design while still providing acceptable results. The polymer material used for the thermal insert of Design B had thermal conductivity on the order of about 0.2 W/m ° C. As shown, Design A had a steady-state temperature on the body of 58.8° C. using the aluminum thermal insert and Design B had a steady-state temperature on the body of 61.1° C. using the polymer thermal insert. Thus, embodiments using thermal insert with relatively high thermal conductivity of about 100 W/m ° C. or greater provide improved thermal performance; however, the use of lower thermal conductivity materials are possible but they may require thermal inserts with an increased cross-sectional area to effectively transport heat energy, and may result in a larger form-factor for the connector to obtain similar results as other materials.

TABLE 5

FE Analysis Results for the eight different models

| | Temperature, ° C. | | | | |
|---|---|---|---|---|---|
| | AL Thermal Insert w/thermal pads and shim | Polymer Thermal Insert w/thermal pads and shim** | AL Thermal Insert w/thermal Pads** | AL Thermal Insert w/PCBA/ Housing Soldered** | AL Thermal Insert w/Copper Plug from CDR & TIA to Housing** |
| | A | B | C | D | E |
| Controller | 75.3 | 76.6 | 75.1 | 68.2 | 65.2 |
| CDR | 78.5 | 75.9 | 74.3 | 67.5 | 64.2 |
| Transciever (TIA) | 80.3 | 81.3 | 78.5 | 69.2 | 65.9 |

TABLE 5-continued

FE Analysis Results for the eight different models

| | Temperature, °C. | | | | |
|---|---|---|---|---|---|
| | AL Thermal Insert w/thermal pads and shim<br>A | Polymer Thermal Insert w/thermal pads and shim<br>B | AL Thermal Insert w/thermal Pads<br>C | AL Thermal Insert w/PCBA/ Housing Soldered<br>D | AL Thermal Insert w/Copper Plug from CDR & TIA to Housing<br>E |
| VCSEL | 78.4 | 79.4 | 76.6 | 67.1 | 64.2 |
| Body | 58.8 | 61.1 | 55.5 | 55.9 | 55.8 |

**Denotes that FE modeling included internal radiation effects

Designs C-E were similar to Design A using the aluminum thermal insert, but included more sophisticated thermal modeling that considered the internal radiation effects within the connector along with the design features noted and resulted in lower body temperatures than Designs A and B. Designs C-E used various other structures for aiding the transfer of heat to the thermal insert to determine the effect on thermal performance. Specifically, Design C included the thermal pads like Design A, but did not use the thermal shim to determine the thermal performance when considering the effects of internal radiation. As shown, Design C had a maximum body temperature of 55.5° C. Design D excluded the thermal pads and thermal shim, but had the PCBA soldered to the housing for providing an improved heat transfer path for allowing heat transfer to the aluminum thermal insert. As shown, Design D had a maximum body temperature of 55.9° C. Design E excluded the thermal pads and thermal shim, but instead used first and second copper plugs thermally attached to the housing and adjacent to the CDR and TIA active components along with a thermal paste disposed between active components and the copper plugs for providing an improved heat transfer path from these active components. As shown, Design E had a maximum body temperature of 55.8° C. All of the examples of Table 5 had a design where the connector maintains an outer surface temperature that is below 65° C. or lower; moreover, most of the embodiments maintained an outer surface temperature that is 60° C. or lower. Thus, the thermal insert may be used with several different alternatives for helping transfer heat away from the active components on the PCBA to the housing and toward the thermal insert.

Figure 20:
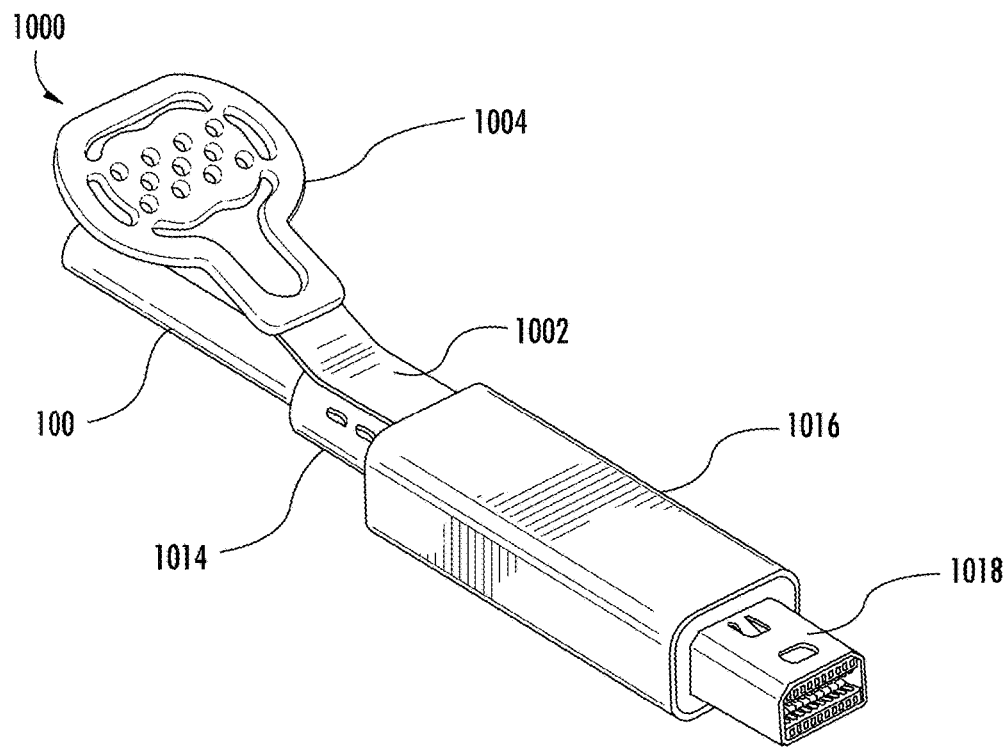
FIGS. 20-25 are various views of another active optical cable assembly having a thermally conductive pull tab for dissipating heat from the connector.
Figure 21:
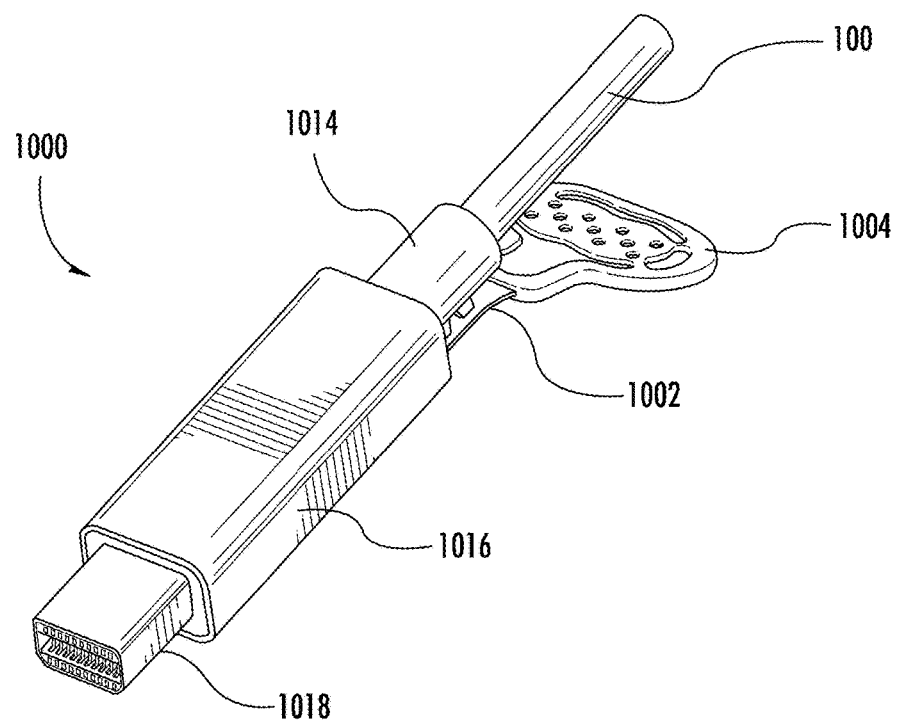
Figure 22:
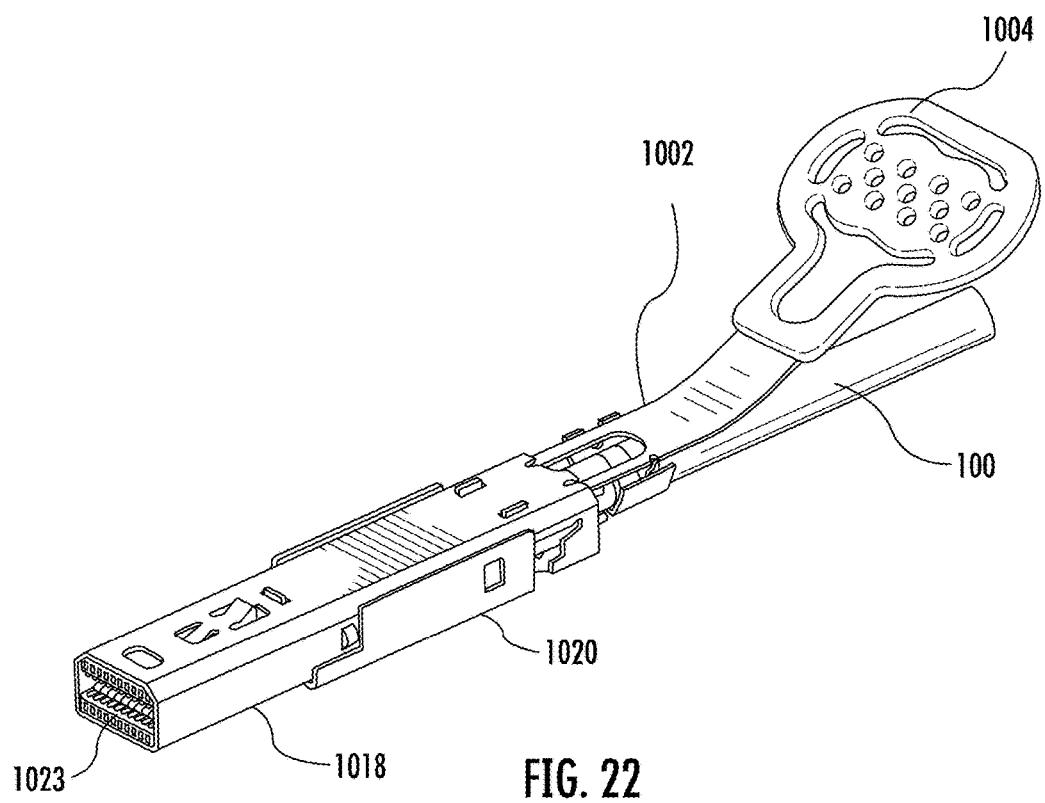
Figure 23:
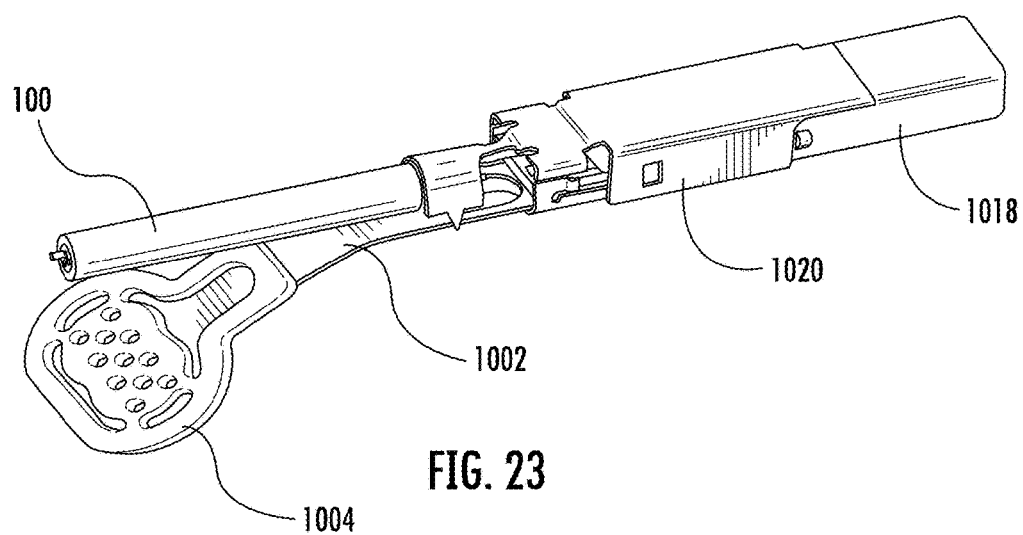

Still other concepts are also possible for achieving a predetermined heat transfer rate from the active components in the connector of an AOC assembly. Illustratively, FIGS. 20-25 are various views of AOC assembly 1000 having fiber optic cable 100 attached to the connector (not numbered). FIGS. 20 and 21 respectively depict top and bottom perspective views of a portion of the complete AOC assembly 1000. The connector includes a connector body 1016 disposed about a housing having a first portion 1018 and a second portion 1020 as best shown in FIGS. 22 and 23. The connector shown includes an electrical interface 1023 at the front end along with a boot 1014 at the rear for providing cable bending strain relief. The connector also includes a pull tab 1002 for dissipating a heat from the connector and may optionally include a raised feature 1004 on the pull tab 1002 so the user does not have to contact the pull tab 1002. Raised feature 1004 may be any suitable material such as a rubber-based material or a polymer. Pull tab 1002 may also be grabbed and pulled by the user for disconnecting the connector when plugged into a device. The pull tab 1002 may be used independently from the other concepts disclosed or in combination with the concepts of a boot and/or connector body with a plurality of fins. Likewise, the boot may be used with or without a thermal insert.

Figure 24:
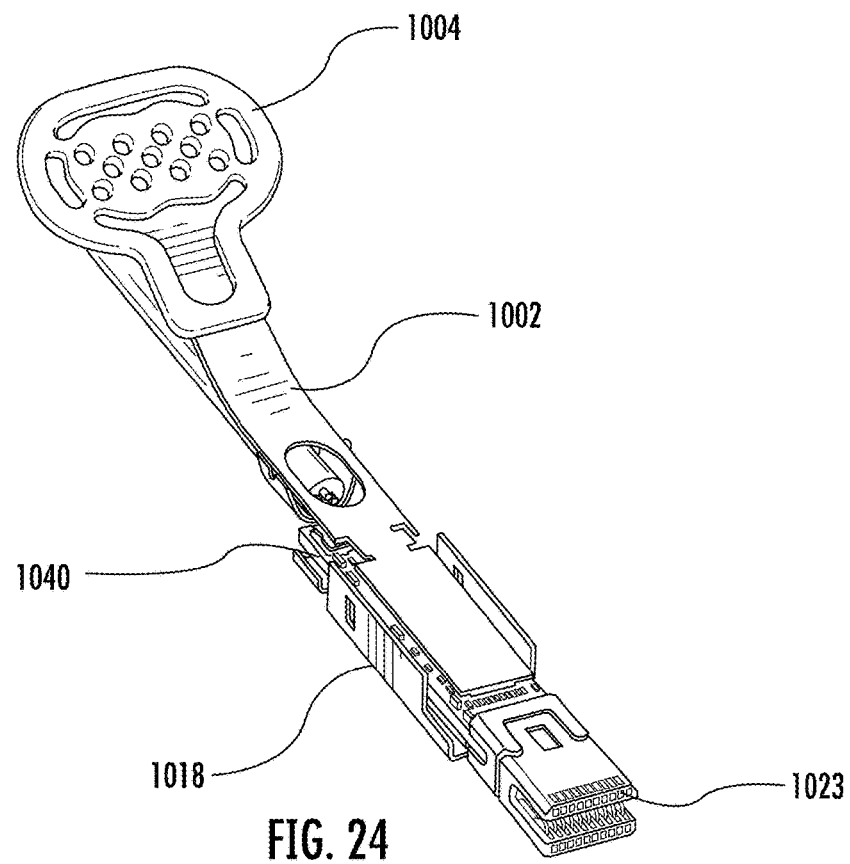
Figure 25:
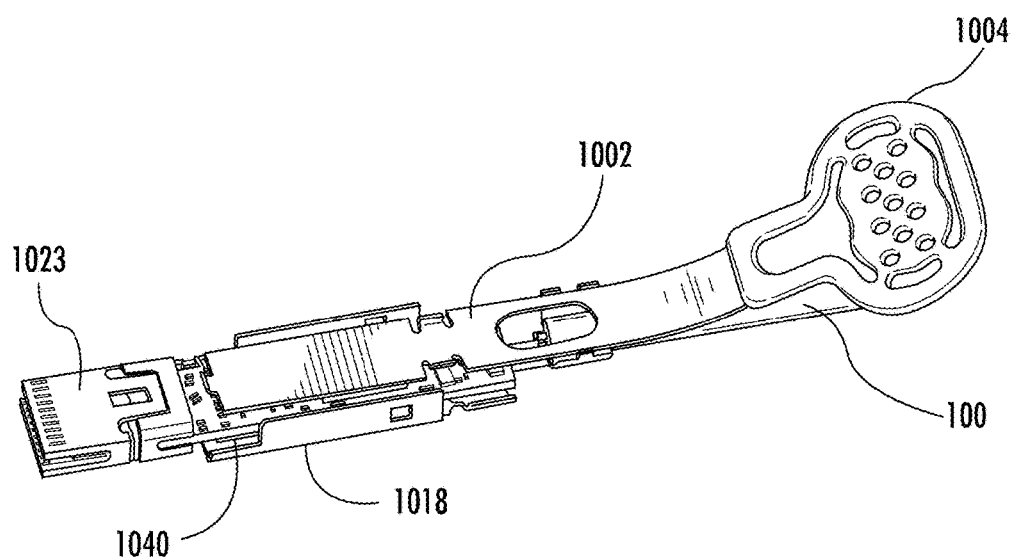

As best shown in FIGS. 24 and 25, pull tab 1002 has a first portion that extends into the housing of the connector and a second portion that extends out of the housing of the connector. FIG. 24 is a perspective top view showing the connector body 1016 and a second portion 1020 of housing removed so the inside of the connector is visible with pull tab 1002 extending into the housing. As shown, the pull tab 1002 has a relatively large surface area for transferring heat from the active components to the pull tab 1002 for dissipating a heat transfer rate of 0.75 Watts or greater from the connector, but in other embodiments the pull tab 1002 may dissipate other suitable heat transfer rates from the connector such as 0.85 Watts or greater.

Pull tab 1002 is in contact or proximity to the heat generating electrical components within the connector for creating an efficient thermal pathway. Further, pull tab 1002 may be made from any suitable material that can transfer heat such as a material including a metal such as copper, a polymer, or a polymer having a filler. Likewise, pull tab 1002 has a suitable size and shape for dissipating heat and allowing attachment to the connector. By way of example, pull tab 1002 may have one or more perforations or cut-out as desired to allow working around components and/or aiding in attachment to the connector. The pull tab 1002 allows the connector to dissipate a suitable heat transfer rate for keeping the surfaces of the connector at a suitable temperature along with allowing the electrical components to operate at a suitable temperature. Moreover, the pull tab may be used independently or in conjunction with the other heat dissipating concepts such as including a connector body and/or boot having a plurality of fins. Additionally, embodiment may or may not include a thermal insert disposed under the boot as desired.

Also disclosed is a method for making an AOC assembly having improved heat transfer characteristics. The method includes providing a fiber optic cable, providing a connector having a housing, and attaching the connector to the fiber optic cable so that the assembly can dissipate a heat transfer rate of 0.75 Watts or greater from the connector. The method may also include overmolding a boot or body that has a plurality of fins. Other embodiments may include attaching a thermal insert under the boot of the connector. Still other embodiments can include attaching a pull tab to the connector.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

We claim:

1. An active optic cable (AOC) assembly, comprising:
   a fiber optic cable comprising a first end attached to a connector;
   the connector comprising a thermal insert having a front portion attached to a housing of the connector, wherein:
     heat generating components of the connector are disposed within the housing and disposed on a printed circuit board assembly;
     the housing is formed from a first housing portion and a second housing portion creating a thermal path between the housing and the thermal insert for dissipating heat from the connector;
     the connector comprises a boot, and a portion of the thermal insert is at least partially disposed under the boot; and
     the assembly dissipates a heat transfer rate of 0.75 Watts or greater from the connector during steady-state operation.

2. The AOC assembly of claim 1, the thermal insert including a metal or a polymer.

3. The AOC assembly of claim 1, further including a total internal reflection (TIR) block attached to at least one optical fiber at the first end of the fiber optic cable.

4. The AOC assembly of claim 1, wherein the fiber optic cable comprises two metal strength members attached to a collar.

5. The AOC assembly of claim 4, wherein the collar comprises an inner portion and an outer portion.

6. The AOC assembly of claim 1, further comprising:
   a thermal pad coupled to the printed circuit board assembly; and
   a thermal shim coupled to the thermal pad and a portion of the thermal insert.

7. The AOC assembly of claim 1, wherein the thermal insert comprises a metal and the boot comprises a filled polymer.

8. An active optic cable (AOC) assembly, comprising:
   a fiber optic cable comprising a first end attached to a connector;
   the connector comprising a collar, a boot, and a thermal insert attached to a housing for dissipating heat from the connector, wherein the assembly dissipates a heat transfer rate of 0.75 Watts or greater from the connector during steady-state operation, and wherein a portion of the thermal insert is at least partially disposed under the boot.

9. The AOC assembly of claim 8, the thermal insert including a metal or a polymer.

10. The AOC assembly of claim 8, further including a total internal reflection (TIR) block attached to at least one optical fiber at the first end of the fiber optic cable.

11. The AOC assembly of claim 8, wherein the fiber optic cable comprises two metal strength members attached to the collar.

12. The AOC assembly of claim 11, wherein the collar comprises an inner portion and an outer portion.

13. The AOC assembly of claim 8, further comprising:
    a printed circuit board assembly within the housing;
    a thermal pad coupled to the printed circuit board assembly; and
    a thermal shim coupled to the thermal pad and a portion of the thermal insert.

14. A method for making an active optic cable (AOC) assembly, comprising:
    providing a fiber optic cable;
    providing a connector comprising a thermal insert attached to a housing; and
    attaching the connector to the fiber optic cable so the assembly dissipates a heat transfer rate of 0.75 Watts or greater from the connector and maintains a portion of a connector outer surface below 60 degrees C. during steady-state operation of the AOC assembly.

15. The method of claim 14, further comprising attaching a boot so that the thermal insert is at least partially disposed under the boot.

16. The method of claim 14, further including attaching a total internal reflection (TIR) block to at least one optical fiber of the fiber optic cable.

17. The method of claim 14, further including attaching two metal strength members of the fiber optic cable to a portion of a collar.

18. The method of claim 17, wherein the collar comprises an inner portion and an outer portion.

19. An active optic cable (AOC) assembly, comprising:
    a fiber optic cable comprising a first end attached to a connector;
    the connector comprising a thermal insert having a front portion attached to a housing of the connector, wherein:
      heat generating components of the connector are disposed within the housing and disposed on a printed circuit board assembly;
      the housing is formed from a first housing portion and a second housing portion creating a thermal path between the housing and the thermal insert for dissipating heat from the connector; and
      the assembly dissipates a heat transfer rate of 0.75 Watts or greater from the connector and maintains a portion of the connector outer surface below 60 degrees C. during steady-state operation.

* * * * *